US011386184B2

(12) United States Patent
Takei et al.

(10) Patent No.: US 11,386,184 B2
(45) Date of Patent: Jul. 12, 2022

(54) INFORMATION PROCESSING APPARATUS, SEARCH SERVER, WEB SERVER, AND NON-TRANSITORY COMPUTER READABLE STORAGE MEDIUM

(71) Applicant: MARS FLAG Corporation, Tokyo (JP)

(72) Inventors: Shinya Takei, Tokyo (JP); Umihito Kusama, Tokyo (JP)

(73) Assignee: MARS FLAG CORPORATION, Tokyo (JP)

( * ) Notice: Subject to any disclaimer, the term of this patent is extended or adjusted under 35 U.S.C. 154(b) by 927 days.

(21) Appl. No.: 15/056,140

(22) Filed: Feb. 29, 2016

(65) Prior Publication Data

US 2016/0179834 A1    Jun. 23, 2016

Related U.S. Application Data

(63) Continuation of application No. PCT/JP2013/005300, filed on Sep. 6, 2013.

(51) Int. Cl.
*G06F 16/248*    (2019.01)
*G06F 16/958*    (2019.01)
(Continued)

(52) U.S. Cl.
CPC .......... *G06F 16/958* (2019.01); *G06F 16/248* (2019.01); *G06F 16/951* (2019.01); *G06F 16/957* (2019.01)

(58) Field of Classification Search
CPC ............. G06F 17/3089; G06F 17/2235; G06F 3/04842; G06F 16/248; G06F 16/338; G06F 16/951; G06F 16/957; G06F 16/958
See application file for complete search history.

(56) References Cited

U.S. PATENT DOCUMENTS 5,845,299 A * 12/1998 Arora .................... G06F 17/218
715/209
6,968,332 B1 * 11/2005 Milic-Frayling ... G06F 16/9535
707/723
(Continued)

FOREIGN PATENT DOCUMENTS

JP    2006-277169 A    10/2006
JP    2009-535978 A    10/2009
(Continued)

OTHER PUBLICATIONS

Takaki Kawazoe et al., "Web no Etsuran o Motto Kaiteki ni Tanoshiku surul Henshubu Osusume 'Kakucho Kino' Best 10", Ascii.PC, May 24, 2011 (May 24, 2011), vol. 14, No. 12, pp. 66 to 67.
(Continued)

*Primary Examiner* — Marcin R Filipczyk
(74) *Attorney, Agent, or Firm* — Snyder, Clark, Lesch & Chung, LLP

(57) ABSTRACT

An information processing apparatus comprising accepting means, transmission means, reception means and display means, wherein in a case where a plurality of pieces of link information is included in a search result and one of the pieces of link information is selected, the transmission means transmits a request for a Web page to a destination server in accordance with that link information, and the information processing apparatus further comprises processing means for, with respect to the Web page received in accordance with the request, searching in that Web page for the search term and processing by inserting a tag for performing an emphasized display of that search term into that Web page, and the display means displays the Web page, into which the tag for the emphasized display is inserted, emphasizing the search term in that Web page.

12 Claims, 21 Drawing Sheets

(51) Int. Cl.
  *G06F 16/951* (2019.01)
  *G06F 16/957* (2019.01)

(56) References Cited

U.S. PATENT DOCUMENTS

| | | | | |
|---|---|---|---|---|
| 8,874,606 | B2* | 10/2014 | Mehanna | G06F 16/245 707/767 |
| 9,323,859 | B2* | 4/2016 | Schonfeld | G06F 16/958 |
| 2008/0172620 | A1* | 7/2008 | Yoshimura | G06F 16/958 707/E17.116 |
| 2010/0306249 | A1* | 12/2010 | Hill | G06F 16/9535 707/769 |

FOREIGN PATENT DOCUMENTS

| | | |
|---|---|---|
| JP | 2010-113730 A | 5/2010 |
| JP | 2011-526394 A | 10/2011 |
| JP | 2011-238273 A | 11/2011 |
| WO | 2007001974 A1 | 1/2007 |
| WO | 2007/015302 A1 | 2/2007 |
| WO | 2007/130274 A1 | 11/2007 |
| WO | 2009/158669 A2 | 12/2009 |

OTHER PUBLICATIONS

International Search Report dated Oct. 1, 2013 in corresponding International Application No. PCT/JP2013/005300, 10 pages.
International Preliminary Report on Patentability dated Oct. 6, 2015 in corresponding International Application No. PCT/JP2013/005300, 16 pages.

* cited by examiner

FIG. 5

| OBTAINMENT SOURCE URL 501 | TEXT 502 | STORAGE DESTINATION URL 503 |
|---|---|---|
| http://www.abc.com/letter.pdf | letter.txt | http://www.search.com/HTML/letter/letter.html |
| | letter001.txt | http://www.search.com/HTML/letter/letter 001.html |
| | letter002.txt | http://www.search.com/HTML/letter/letter 002.html |
| | letter003.txt | http://www.search.com/HTML/letter/letter 003.html |
| | ▪ | ▪ |
| | ▪ | ▪ |
| | letter050.txt | http://www.search.com/HTML/letter/letter 050.html |
| http://www.abc.com/paper.pdf | paper.txt | http://www.search.com/HTML/paper/paper.html |
| | paper001.txt | http://www.search.com/HTML/paper/paper001.html |
| | paper002.txt | http://www.search.com/HTML/paper/paper002.html |
| | paper003.txt | http://www.search.com/HTML/paper/paper003.html |
| | ▪ | ▪ |
| | ▪ | ▪ |
| | paper030.txt | http://www.search.com/HTML/paper/paper030.html |
| http://www.abc.com/maindocument.html | document.txt | ▪ |
| http://www.abc.com/applications.html | applications.txt | |
| ▪ | ▪ | |
| ▪ | ▪ | |

| OBTAINMENT SOURCE URL 601 | PAGE IMAGE 602 | THUMBNAIL IMAGE 603 | REPRESENT-ATIVE FLAG 604 | STORAGE DESTINATION URL 605 |
|---|---|---|---|---|
| http://www.abc.com/letter.pdf | letter001.jpg | letterS001.jpg | 1 | http://www.search.com/JPG/letter/ |
| | letter002.jpg | letterS002.jpg | 0 | |
| | letter003.jpg | letterS003.jpg | 0 | |
| | ∗ | ∗ | ∗ | |
| | letter050.jpg | letterS050.jpg | 0 | |
| http://www.abc.com/paper.pdf | paper001.jpg | paperS001.jpg | 0 | http://www.search.com/JPG/paper/ |
| | paper002.jpg | paperS002.jpg | 0 | |
| | paper003.jpg | paperS003.jpg | 0 | |
| | paper004.jpg | paperS004.jpg | 1 | |
| | ∗ | ∗ | ∗ | |
| | paper030.jpg | paperS030.jpg | 0 | |
| http://www.abc.com/maindocument.html | document.jpg | documentS.jpg | 1 | http://www.search.com/JPG/document/ |
| http://www.abc.com/applications.html | apps.jpg | appsS.jpg | 1 | http://www.search.com/JPG/apps/ |
| ∗ | ∗ | ∗ | ∗ | ∗ |

600

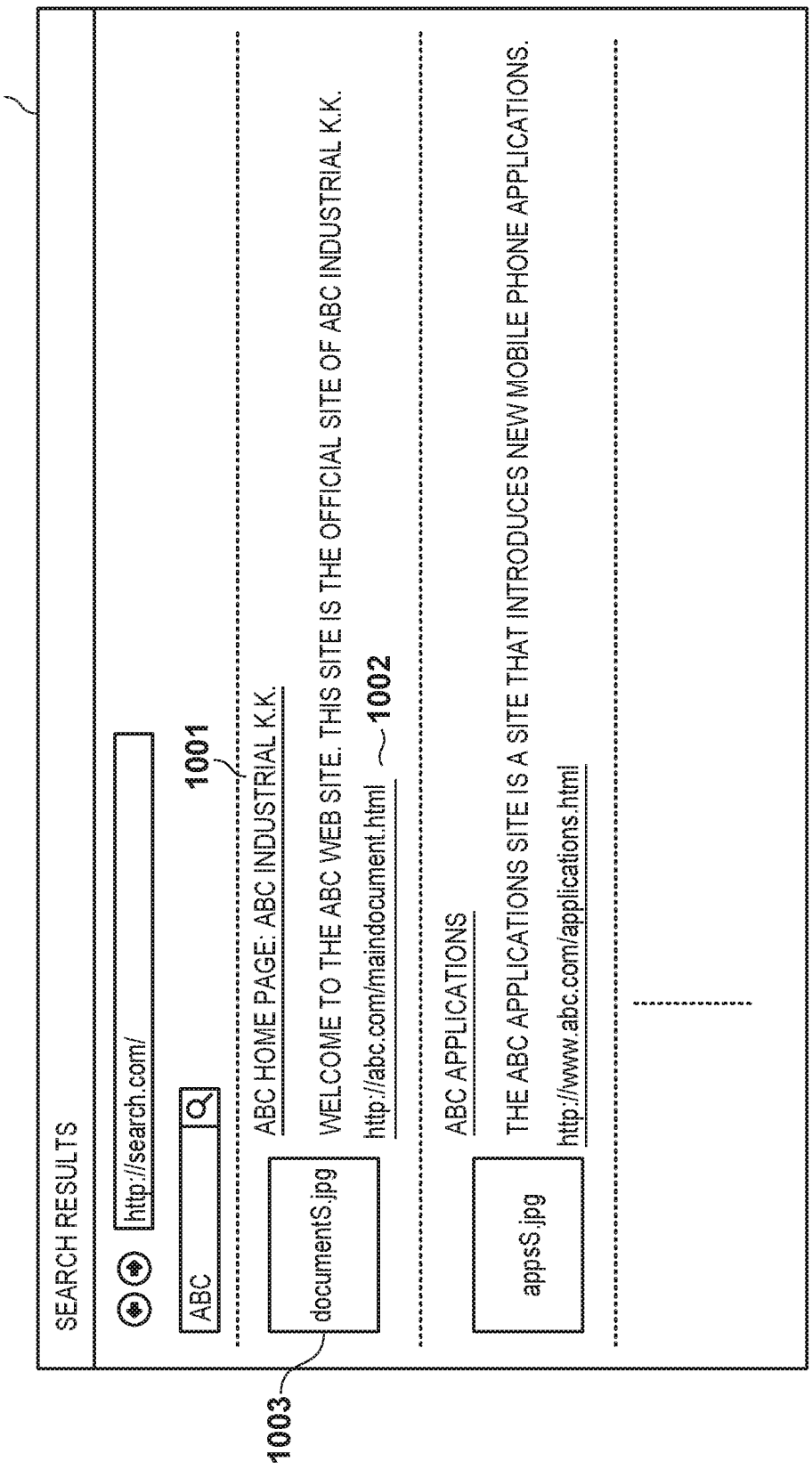

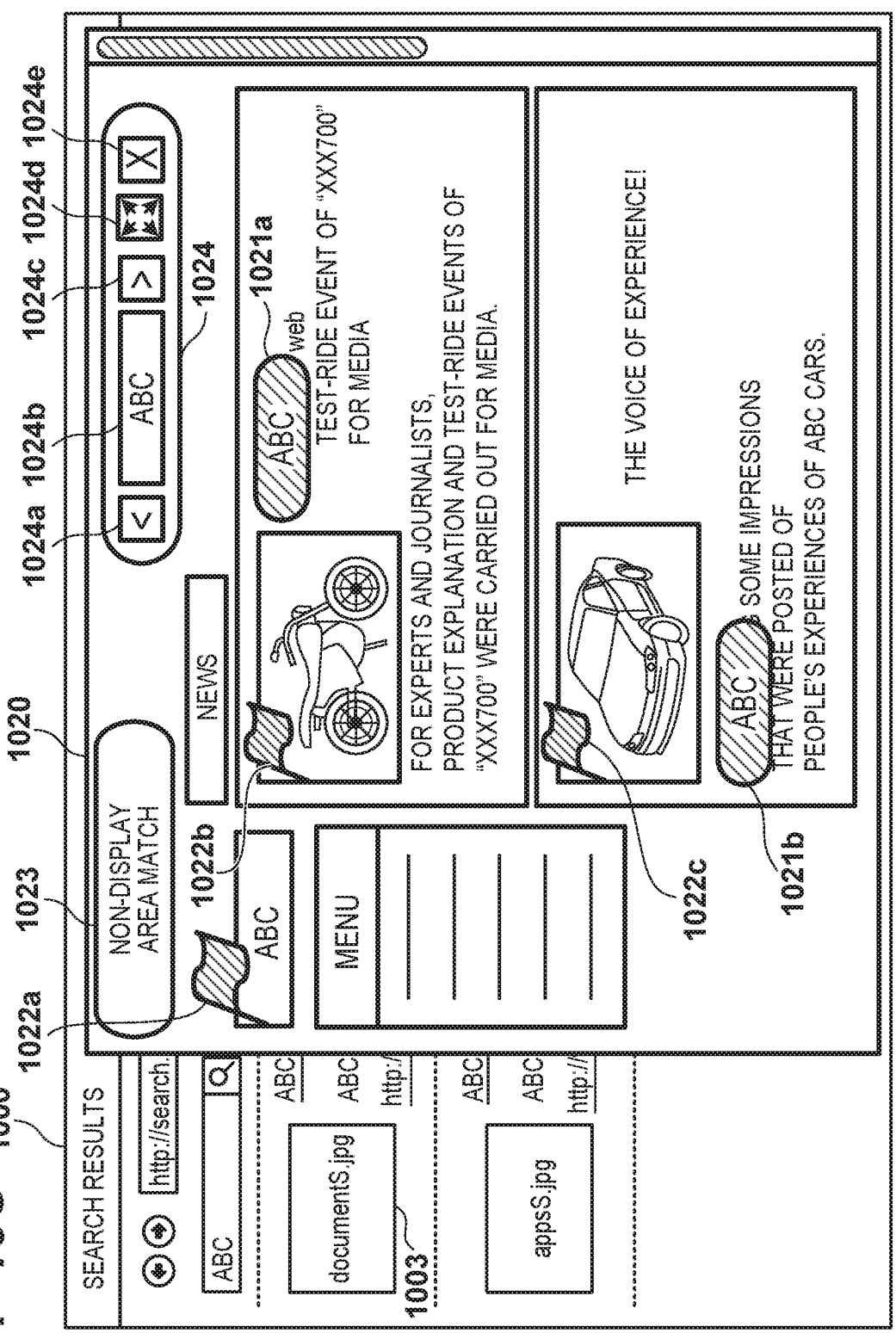

F I G. 10D
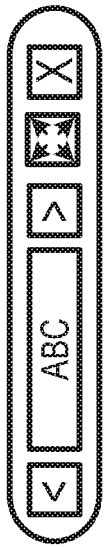
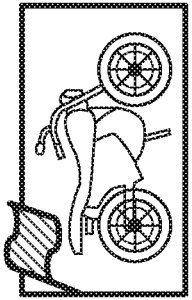
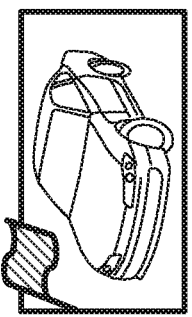

FIG. 11

```
<html>
<head>                                                          1101
```
```
<title> ABC HOMEPAGE: ABC INDUSTRIAL K.K. </title>
```
1102
```
<style type="text/css">
<!--
em {
position: absolute;
font-size: large;
font-weight: bold;
color: black;
background-color: yellow;
border-radius: 20px;
box-shadow: 3px 3px 4px 0px gray;
}
-->
</style>
```
```
<meta name="keywords"
content="ABC HOMEPAGE, ABC, ABC INDUSTRIAL K.K., ABC INDUSTRIAL">
<meta name="description"
content="WELCOME TO THE ABC WEB SITE. THIS SITE IS THE
OFFICIAL SITE OF ABC INDUSTRIAL K.K.">
```
```
</head>                                                         1103
<body>                                                    1104
```
```
<em> NON-DISPLAY AREA MATCH </em>
```
```
<img alt="ABC LOGO" src="...ABC..." /> <em>ABC </em>
```
```
INTRODUCING SOME IMPRESSIONS THAT WERE POSTED OF PEOPLE'S
EXPERIENCES OF <span>ABC</span> <em>ABC</em> CARS.
```
```
</body>                                              1106    1105
</html>
```

INFORMATION PROCESSING APPARATUS, SEARCH SERVER, WEB SERVER, AND NON-TRANSITORY COMPUTER READABLE STORAGE MEDIUM

This application is a continuation of International Patent Application No. PCT/JP2013/005300 filed on Sep. 6, 2013, the entire content of which is incorporated herein by reference.

TECHNICAL FIELD

The present invention relates to an information processing apparatus, a search server, a Web server, and a non-transitory computer readable storage medium.

BACKGROUND ART

In recent years, the Internet has spread rapidly, and it has become possible to acquire vast amounts of information via the Internet. A search engine is the most effective means for handling such vast amounts of information efficiently.

There are search engines that search an unspecified great number of pieces information on the Internet relying on search terms, and those that search information in specific Web sites similarly in accordance with search terms.

In either case, the search results are displayed in a list, and when a user clicks a link destination included in the list, that page is displayed (refer to Japanese Patent Laid-Open No. 2011-238273), or an image of that page is displayed (refer to Japanese Patent Laid-Open No. 2010-113730).

However, in the forms for results display that are disclosed in the foregoing documents, a user is forced to once again search by oneself for where in the documents of the link destinations of the search results the search term is present. Also, in the display form illustrated in FIG. 8 of Japanese Patent Laid-Open No. 2011-238273, while information of a page that is cached on a server is displayed when a cache destination indicated by "Cached" is clicked, and it is also possible that a search term is highlighted on that page, this is something that shows content at the point in time when that page was stored on the server, and it is not showing content of the current page; also that cached page is reference information attached to the search results, and it is not a document of the search results itself.

SUMMARY OF INVENTION

The present invention was conceived in view of the above described issues, and a user can easily identify a position of a search term in a document of search results, and a user can efficiently and swiftly reach a target document.

One embodiment of the invention relates to an information processing apparatus, comprising, an accepting unit configured to accept an input of a search term, a transmission unit configured to transmit a search instruction based on a search term to an external search server, a reception unit configured to receive a search result based on the search instruction, and a display unit configured to display a search result, wherein in a case where a plurality of pieces of link information is included in the search result and one of the pieces of link information is selected, the transmission unit transmits a request for a Web page to a destination server in accordance with that link information, and the information processing apparatus further comprises processing unit for, by executing a script described in the Web page, with respect to the Web page that the reception unit received in accordance with the request, searching in that Web page for the search term, and processing by inserting a tag for performing an emphasized display of that search term into that Web page, and the display unit displays the Web page, into which the tag for the emphasized display is inserted, emphasizing the search term in that Web page.

Another embodiment of the invention relates to a search server that receives the search instruction based on a search term from the foregoing information processing apparatus, and executes a search process, the server comprising, a reception unit configured to receive a search term from the information processing apparatus, a search unit configured to search a full-text search database using the search term to generate a search result, a transmission unit configured to transmit the search result to the information processing apparatus, and a processing unit configured to describe in a Web page a script that is executed by the information processing apparatus, and that is a script for causing that information processing apparatus to perform processing by searching for a search term in that Web page, and inserting a tag for performing an emphasized display of that search term in that Web page, wherein the search unit includes in the search result a script for, in a case where one of pieces of link information in the search result in the information processing apparatus is selected, causing that information processing apparatus to display a Web page, that corresponds to that link information and that is a Web page into which a tag for an emphasized display of a search term is inserted, and the transmission unit, in a case where the reception unit receives a request of a Web page corresponding to one of the pieces of link information in the search result from the information processing apparatus, transmits a Web page in which the script corresponding to the requested Web page is described to the information processing apparatus.

Another embodiment of the invention relates to a Web server, comprising, a reception unit configured to receive, from an information processing apparatus, a request for a Web page included in a search result which that information processing apparatus obtained, wherein the search result is based on a predetermined search term, and a transmission unit configured to transmit that requested Web page to that information processing apparatus, wherein in the Web page that the transmission unit transmits a script that is executed by the information processing apparatus, and that is a script for causing that information processing apparatus to perform searching for the search term in the Web page, and processing by inserting a tag for performing an emphasized display of that search term in that Web page is described.

Further features of the present invention will become apparent from the following description of exemplary embodiments (with reference to the attached drawings).

BRIEF DESCRIPTION OF DRAWINGS

FIG. 5 is a view for illustrating an example of a data configuration of a table for text search in a full-text search database 105 that is generated by processing corresponding to the flowchart of FIG. 4 corresponding to an embodiment of the invention.

FIG. 6 is a view for illustrating an example of a data configuration of an image registration table in an image database 106 that is generated by processing in accordance with the flowchart of FIG. 4 corresponding to an embodiment of the invention.

FIG. 10A is a view for illustrating an example of a search results window display corresponding to an embodiment of the invention.

FIG. 10C is a view for illustrating an example of a search results preview display that performs an emphasized display of a search term corresponding to an embodiment of the invention.

FIG. 10D is another view for illustrating an example of a search results preview display that performs an emphasized display of a search term corresponding to an embodiment of the invention.

FIG. 11 is a view for illustrating an example of a source file of a Web page for which processing is performed to perform an emphasized display of a search term corresponding to an embodiment of the invention.

DESCRIPTION OF EMBODIMENTS

First Embodiment

An embodiment of the present invention will be described hereinafter with reference to the attached drawings. However, the configuration elements described in this embodiment are only examples, and the scope of the invention is not limited to these.

<System Configuration>

Figure 1:
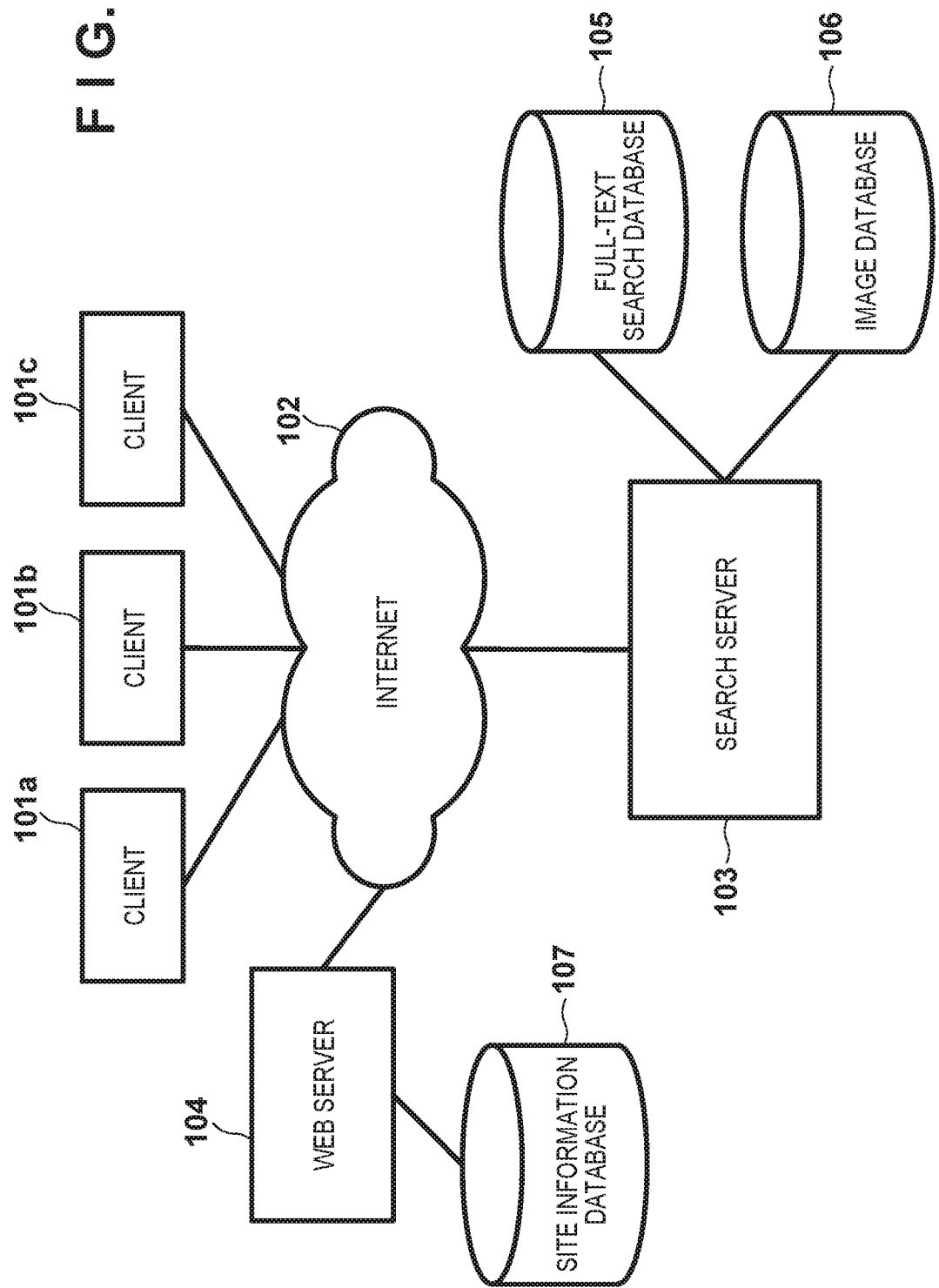
FIG. 1 is a block diagram for illustrating an overall configuration of a system for searching Web sites on the Internet corresponding to an embodiment of the invention.

FIG. 1 is a block diagram for illustrating an overall configuration of a search system corresponding to the present embodiment. Clients 101a, 101b, and 101c (hereinafter these are referred to collectively as "the client 101") on which a user by an operation causes the search server 103 to perform a search whose target is document files that can be obtained on the Internet and which obtain a search result thereof, the search server 103 that performs an Internet search, and the Web server 104 that provides Web site information are respectively connected to the Internet 102. The full-text search database 105 and the image database 106 are connected to the search server 103. A site information database 107 is connected to the Web server 104.

The client 101 is an information processing apparatus on which a user can operate to browse Web site information that the Web server 104 publishes on the Internet, and encompasses a notebook computer, a desktop personal computer, a mobile information terminal, a cellular phone, a smart phone, a tablet terminal, or the like. It is assumed that so-called Internet browser software is installed on the client 101.

The client 101 is connected to the Internet 102 by a LAN which is an access means encompassing an Ethernet (registered trademark) network cable, or the like. Note that means for accessing the network 102 is not limited to the Ethernet (registered trademark) cable, and may be configured by wireless communication means such as a wireless LAN. The search server 103, which is described later, comprises similar access means.

The Internet 102 is a network in which networks throughout the world are connected to each other, but, for example, it may be a network to which it is possible to connect only within a specific organization such as an intranet.

The search server 103 is an information processing apparatus that provides a search service for searching for document files that can be obtained on the Internet including a Web page included on a Web site providing information relating to a specific business, store or individual person to the client 101.

The search server 103 manages information stored in the full-text search database 105 and the image database 106. The search server 103 is connected to the full-text search database 105 and the image database 106 by a LAN, for example. The Web server 104 manages information stored in the site information database 107. The Web server 104 is connected to the site information database 107 by the LAN, for example.

The full-text search database 105, the image database 106, and the site information database 107 are information processing apparatuses on which predetermined database software is respectively installed, and which perform management of various data.

The full-text search database 105 is a database linking words, meta-information of pages (URL, title, search rank, or the like), based on content of a Web page stored on the site information database 107 which is explained later. An example of information registered in the full-text search database 105 is described later with reference to FIG. 5. The search server 103 performs a search employing the full-text search database 105 using a search term that is user-specified and received from the client 101. The image database 106 is a database that stores image data obtained by converting a document file registered in the site information database 107. An example of information registered in the image database 106 is described later with reference to FIG. 6.

The site information database 107 manages information of document files for publishing a Web site on the Internet 102. In addition to an HTML file and a PDF file, files used by specific applications (for example, MS Word, or the like) are included in the document files. It is possible to include information relating to a Web site owner and a product that an owner provides or the like in these document files. For example, in a case in which a Web site is a corporate homepage, in addition to a company overview, and information directed at investors, or the like, information of products that a corporation manufactures/sells, and other information relating to various services that a corporation provides are stored in the site information database 107. For example, in a case where a service that a corporation provides is a blog provision service, blog information that a user that receives the service provisioning creates is included. The latest dynamically updated information is stored in the site information database 107.

Note that in the present specification, for convenience, the search server 103, the Web server 104, the full-text search database 105, the image database 106, and, the site information database 107 are respectively explained as being realized by physically independent information processing apparatuses, but embodiments of the present invention are not limited to this. For example, these may be realized by a single information processing apparatus. On the other hand, each apparatus such as the search server 103 may be configured redundantly by a plurality of information processing apparatuses, or by a distributed configuration. Also, the full-text search database 105 and the image database 106 are explained as connected to the search server 103 by a LAN or the like, but, for example, a form may be taken in which it is possible to communicate with the search server 103 via the Internet 102 or an intranet (not shown). The same applies to the relationship between the Web server 104 and the site information database 107.

Also, in the present embodiment, in order to simplify the explanation, a case in which searching and site publication are executed individually on the search server 103 and the Web server 104 is recited, but the configuration of the system is not limited to this. Specifically, it is possible to arrange the server for site publication and the server for searching to be the same. In such a case, the form of the searching may be an Internet search, and may be a search within a site that searches information of the site which is published on the server itself. Note that, a Web site can be said to be a group of Web pages published as a whole. A Web site may be, for example, a corporate or a personal homepage, or the like.

<Information Processing Apparatus Configuration>

Figure 2:
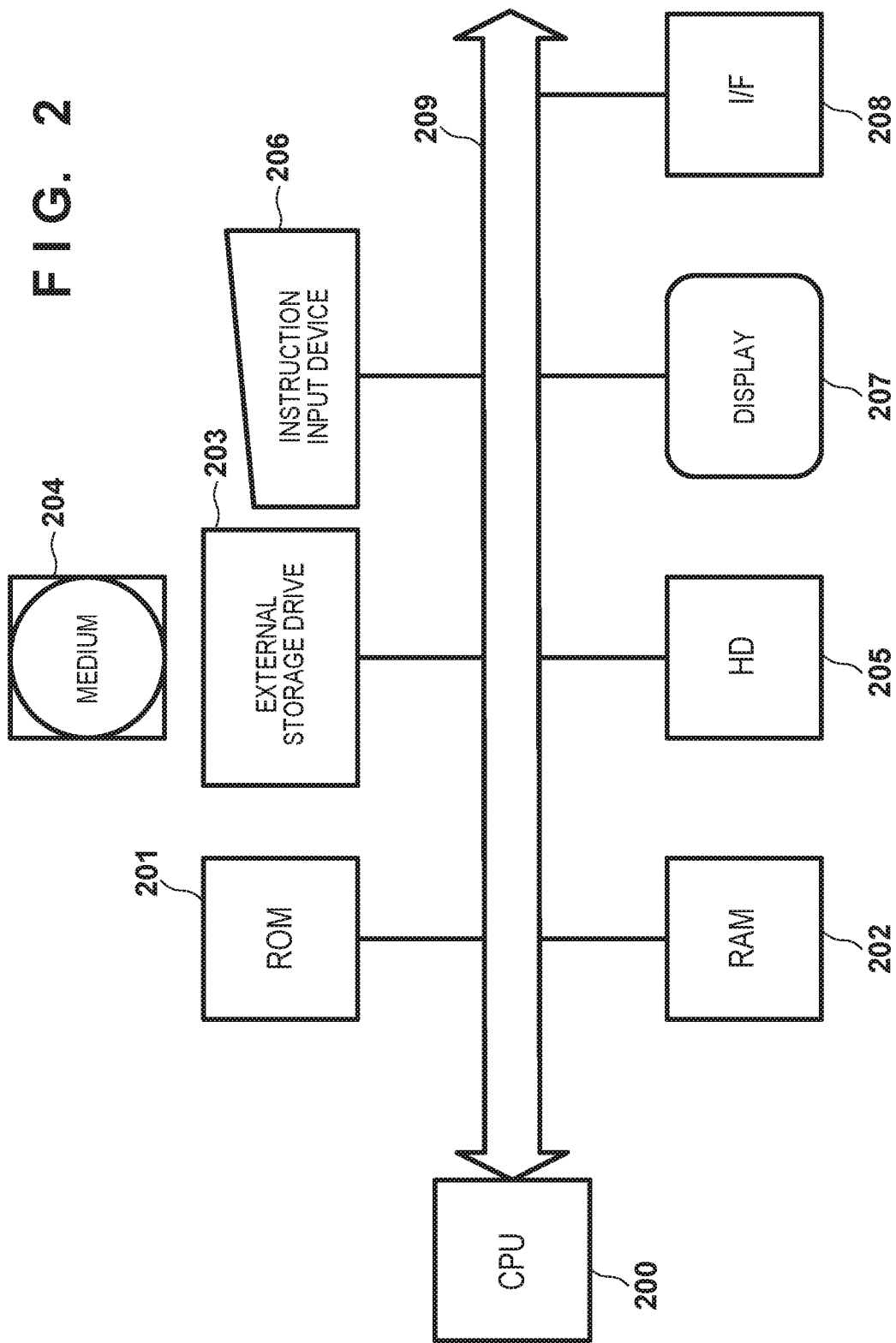
FIG. 2 is a block diagram for illustrating an example of a hardware configuration of a client 101 corresponding to an embodiment of the invention.

Next, explanation will be given for an outline of an information processing apparatus that configures the search system corresponding to the present embodiment. FIG. 2 is a block diagram for illustrating an example of a hardware configuration of the client 101. The foregoing full-text search database 105, the image database 106, and the site information database 107 which are information processing apparatuses may also be configured to have similar or equivalent hardware configurations.

In FIG. 2, a CPU 200 executes application programs, an operating system (OS), control programs, or the like, which are stored in a hard disk apparatus (hereinafter referred to as an HD) 205, and performs control for temporarily storing files, information necessary for execution of the program, or the like, in a RAM 202. Note that later described processing in FIG. 7A through FIG. 7H is realized by the CPU 200 controlling the apparatus on the whole by executing corresponding processing programs.

A ROM 201 stores programs such as a basic I/O program, and various data such as font data or template data used when performing document processing, or the like. The RAM 202 temporarily stores various data, and functions as a main memory, a work area or the like for the CPU 200.

An external storage drive 203 is an external storage drive for realizing access to a recording medium, and the external storage drive 203 can load a program stored in a medium (a recording medium) 204 into this computer system. Note that the medium 204 can use a floppy (registered trademark) disk (FD), a CD-ROM, a CD-R, a CD-RW, a PC card, a DVD, Blu-ray, an IC memory card, MO, a memory stick, or the like for example.

An HD (hard disk) that functions as a large capacity memory is used for an external storage device 205 in the present embodiment. Application programs, an OS, control programs, related programs, or the like, are stored in the HD 205. Note that in place of the hard disk, a nonvolatile storage apparatus such as a Flash (registered trademark) memory may be used.

An instruction input device 206 corresponds to a keyboard, a pointing device (a mouse or the like), a touch panel, or the like. Using the instruction input device 206, a user makes an input instruction such as a command for controlling the apparatus to the client 101. A display 207 displays a command inputted from the instruction input device 206, and a response output of the client 101 in response to that, or the like. A system bus 209 is responsible for a flow of data in the information processing apparatus. An interface (hereinafter referred to as I/F) 208 fulfills a role of mediating exchange of data with an external apparatus.

Note that, by software for realizing functions equivalent to those of the foregoing apparatuses, it is possible to configure an alternative to the hardware apparatuses.

Configuration may be taken such that whenever a corresponding program is caused to operate to execute processing corresponding to the present embodiment, the program is loaded from the HD 205 in which it is previously installed into the RAM 202. Also, a program according to the present embodiment is recorded in the ROM 201, and configured so as to be a part of a memory map, and can be executed by the CPU 200 directly. Furthermore, it is possible to load a corresponding program and related data from the medium 204 into the RAM 202 directly, and cause the program to execute.

Figure 3:
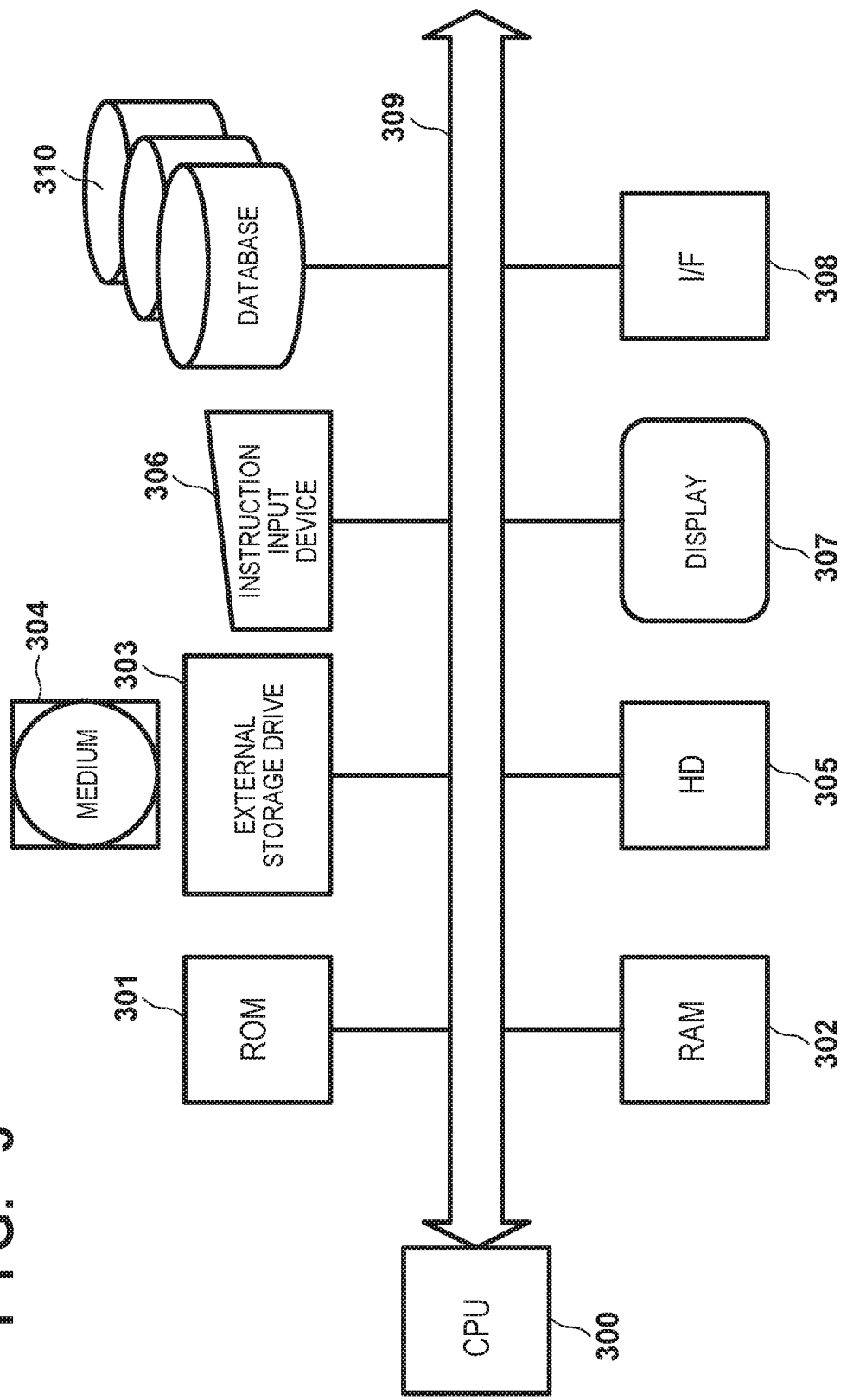
FIG. 3 is a block diagram for illustrating a device configuration of a search server 103 and a Web server 104 corresponding to an embodiment of the invention.

FIG. 3 is a block diagram for illustrating a device configuration of the search server 103 and the Web server 104. Regarding functions and applications of the CPU 300, the ROM 301, the RAM 302, the external storage drive 303, the medium 304, the HD 305, the instruction input device 306, the display 307, the I/F 308, and the system bus 309, and also relations therebetween, it is similar or equivalent to what is explained using FIG. 2. In FIG. 3, it is noted that a database 310 is connected to the system bus 309. Here, the database 310 is a generic term for the full-text search database 105, the image database 106, or the site information database 107.

<Generation of Data for Searching>

Figure 4:
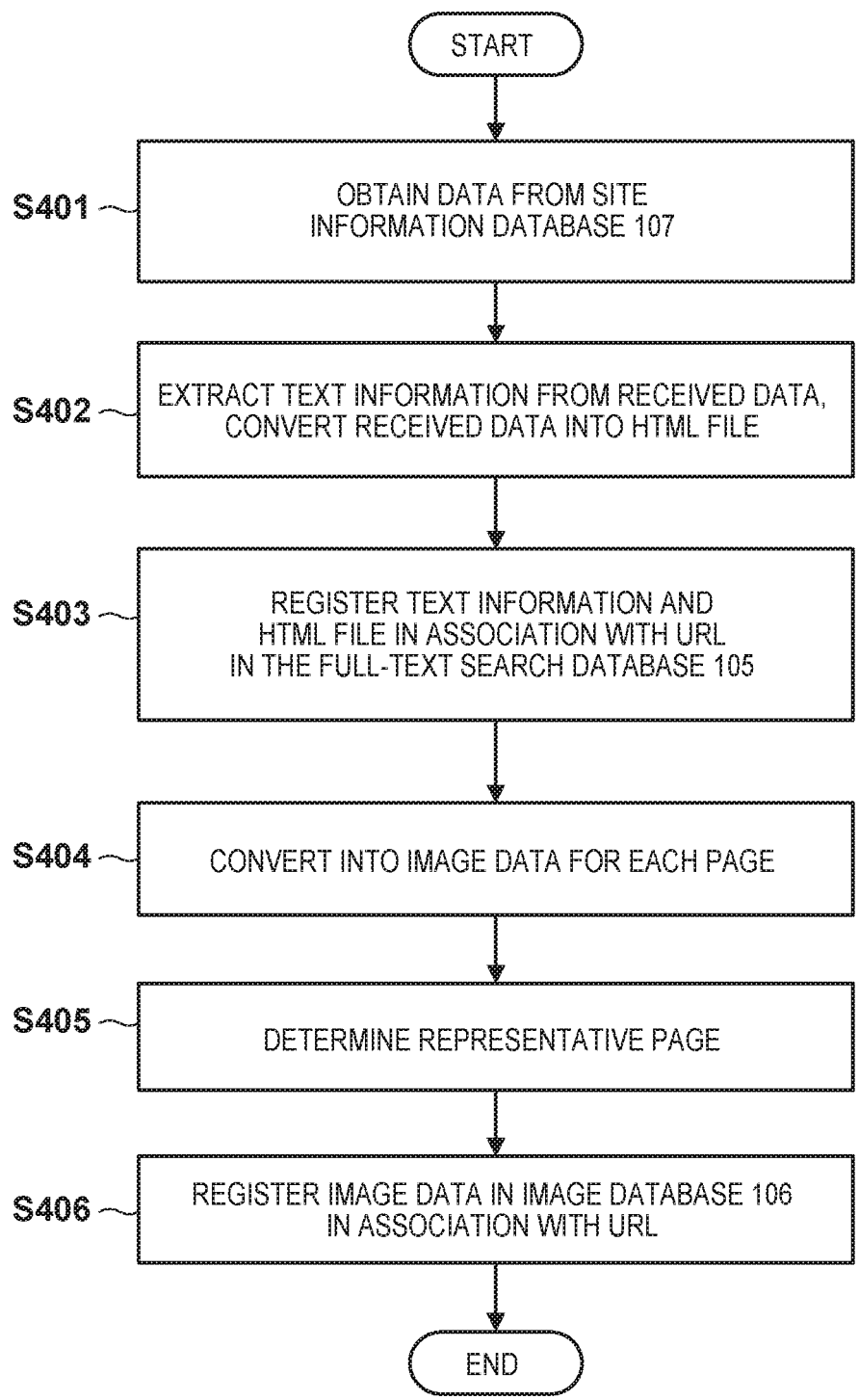
FIG. 4 is a flowchart for illustrating an example of processing for generating image data and text data for searching in the search server 103 corresponding to an embodiment of the invention.

Next, explanation is given for processing for generating data for searching corresponding to an embodiment of the invention with reference to a flowchart of FIG. 4 and tables of FIG. 5 and FIG. 6. FIG. 4 is a flowchart for illustrating an example of processing for generating image data and text data for searching in the search server 103 corresponding to an embodiment of the invention. Processing corresponding to FIG. 4 is realized by the search server 103 executing a processing program held in the HD 305, the database 310 or the like by the CPU 300. FIG. 5 is a view for illustrating an example of a data configuration of a table for text search in the full-text search database 105 that is generated by processing corresponding to the flowchart of FIG. 4. FIG. 6 is a view for illustrating an example of a data configuration of an image registration table in the image database 106 that is generated by processing in accordance with the flowchart of FIG. 4.

In FIG. 4, in step S401, data to be processed which is stored in the site information database 107 is obtained via the Internet 102 from the Web server 104. In addition to HTML format page data, a document file such as a PDF file, a Word file, an Excel file, or a PowerPoint file is encompassed in the data obtained here.

Continuing on, in step S402, text information of the entire document is extracted from the obtained data. The target data extracted here is not only the body data of the document file but also information included in tags if it is an HTML format page. For example, if a title, a table, an image tag, or a meta tag that defines information of the page is included in the page in the following way, the text information attached to the tag which is surrounded by quotation marks is a target of the extraction.

<a title="click here for race results" href=" . . . "> . . . </a>
<table summary="2012 race results"/>
<img alt="ABC logo" src=" . . . "/>
<title>ABC homepage: ABC Industrial K.K. </title>
<meta name="keywords" content="ABC homepage, ABC, ABC Industrial K.K., ABC industrial">
<meta name="description content="Welcome to the ABC Web site. This site is the official site of ABC Industrial K.K.">

Also, in step S402, data of file formats other than HTML such as a PDF file, a Word file, an Excel file, or a PowerPoint file is converted into a file of an HTML format (Web page).

In step S403, the text information extracted in step S402 is divided into information in units of pages, and registered in the full-text search database 105 in association with the URL of the document file. At that time, an HTML file obtained by converting a PDF file, or the like, is also registered. Note that in the present embodiment, registration is in the full-text search database 105, but a separate database may be prepared.

A state is which text information and HTML files are registered in the full-text search database 105 is as illustrated in a table for text search 500 of FIG. 5. In the table for text search 500, URLs by which document files were obtained are registered in an obtainment source URL 501. For example, for document files such as "maindocument.html" and "letter.pdf", the URLs "http://www.abc.com/maindocument.html" and "http://www.abc.com/letter.pdf" are registered as the obtainment source URL.

In a text 502, text data corresponding to a document file of the obtainment source URL is registered. In such a case, if it is possible to access the document file in units of pages, both text data of the file on the whole and in units of pages are registered. For example, if the file of "letter.pdf" is configured by 50 pages, the file on the whole can be designated by "http://www.abc.com/letter.pdf", while a display page can be designated "http://www.abc.com/letter.pdf#page=N" if a particular page is caused to be displayed in this file. Here, N indicates the page number, and in the case of "letter.pdf" N=1, 2, 3, . . . 50. In the text 502 in the case of "letter.pdf", letter.txt which is a text file for the document file on the whole, and letterN.txt (N=001, 002, . . . 050) which is a text file for a respective page are registered. Note that for a file that is of an HTML format to begin with such as "http://www.abc.com/maindocument.html", only one text file (document.txt) is registered for the text 502 as the whole without dividing into units of pages.

By using this table 500, it is possible to manage text information of the entire document, and text information in units of pages in association with the document file.

Also, in the table 500, an HTML file obtained by converting a non-HTML format document file such as a PDF file is also registered. Such an HTML file is provided to the client 101 as later described preview information. A storage destination URL 503 is managed in unit of source files, and for an HTML file obtained by converting "letter.pdf", for example, "http://www.search.com/HTML/letter/letter.html" is given as the URL. Also, in the present embodiment, an HTML file for the file on the whole which is generated from the original file, and an HTML file corresponding to each page are respectively registered. For example, for the file on the whole which is "letter.pdf", "letter.html" is registered, and for a page in the middle of "letter.pdf", for example "letter002.pdf" is registered if it is the second page. The information of the storage destination URL 503 can be used in a search result as link information when preview information is provided to the client 101. Additionally, because what is registered on the side of the search server 103 as an HTML file is things that are not originally an HTML format file, it is not necessary to manage something provided from the Web server 104 in the HTML format as is "maindocument.html" as an HTML file on the side of the search server. Note that, when converting from a document file of a non-HTML format to an HTML file, a script for causing the client 101 to execute processing in the preview information display state illustrated in FIG. 7H which is described later is recorded in the HTML file.

Returning to the explanation of the flowchart of FIG. 4, and continuing on, in step S404, image data of each page of the document file obtained in step S401 is generated. Specifically, using an application for displaying a document file, after loading displayable information in units of pages in the RAM 302, the information on the RAM 302 is converted into image data. The format of the image data can be made to be JPEG, for example, but the format is not limited to this. Also, the method of converting into the image data of the document file is not limited to the foregoing method, and it is possible to execute it using another publicly known technique. Also, in step S404, a plurality of image data items are generated where the resolution of image data for a preview (preview image) and data for a search result list display (thumbnail image) are different.

Next, in step S405, in the pages that configure the document file, a representative page is determined. The first page, for example, may always be selected for the representative page, or a page having a largest number of colors in the pages, or a page having the highest coefficient in a high-frequency component when a frequency analysis is performed for each page may be selected.

Continuing on, in step S406, the image data generated in step S404 is registered in the image database 106 in association with the URL of the document file. An example of the image registration table in the image database 106 generated here is as is illustrated in FIG. 6.

In FIG. 6, in the image registration table 600, a URL corresponding to image data is registered in an obtainment source URL 601. Regarding the registered URL, a URL of a document file is registered similarly to in the table 500 of FIG. 5, and this is associated with the registered content of the obtainment source URL 501 in the table 500.

Next, for a page image 602, image data for each page obtained by converting the document file is registered. This image data is an image displayed on the display 207 of the client 101 in place of the document file if selected in the list of the search results. The file name of the image data can be made to correspond to the page text 502 of FIG. 5, for example. Because the page image 602 is associated with the obtainment source URL 601, text and an image can be associated in a one-to-one relationship based on the obtainment source URL 501 in the table for text search 500.

Also, in the image registration table 600, for a thumbnail image 603, a reduced image of image data for each page registered for the page image 602 is registered in association with a corresponding URL. This thumbnail image is used to provide an image of a search result upon a list display of search results. A representative flag 604 is a flag for designating a thumbnail image and a page image representing the document file on the whole, and for one document file for a set of a page image and a thumbnail image, the value "1" is given, and for other images the value is "0". For example, for the document file of the obtainment source URL "http://www.abc.com/letter.pdf", "letter001.jpg" and "letterS001.jpg" are respectively the representative images. Additionally, a flag value may be set for a generated image even if the image is not generated in units of pages as in the case of "maindocument.html". Also, the representative flag item itself need not be provided if, for example, the first page is always selected as the representative page.

Next, a storage destination URL 605 illustrates a URL of a storage destination of a thumbnail image and a page image. Each page image and the thumbnail image are managed in units of source files, and for an image of "letter.pdf", for example, "http://www.search.com/JPGL/letter/" is given as the URL. By combining the file names of the page image 602 or the thumbnail image 603 and the URL of the storage destination URL 605, it is possible to use each image in a search result as link information that identifies each image uniquely. By the above, it is possible to generate image data and text information for searching a document file stored in a desired URL.

Next, explanation is given of details of search processing executed by the search system of the present invention based on the configuration illustrated in FIG. 1 through FIG. 6.

FIG. 7A through FIG. 7J are state transition views for illustrating an example of search processing corresponding to an embodiment of the invention in accordance with an SDL (Specification and Description Language) description method. The processing corresponding to FIG. 7A through FIG. 7J is realized by the client 101, the search server 103, and the Web server 104 each executing a processing program that they respectively hold. Also, communication between the client 101, the search server 103, and the Web server 104 can be realized using a communication function of a Web browser executed on the client 101, or a communication function of a plug-in (an extension program) of a Web browser. For example, it can be realized in accordance with an HTTP protocol using Java (registered trademark) Script. In addition, Flash or the like may be used, and communication may be in accordance with another protocol that is not HTTP.

Figure 7A:
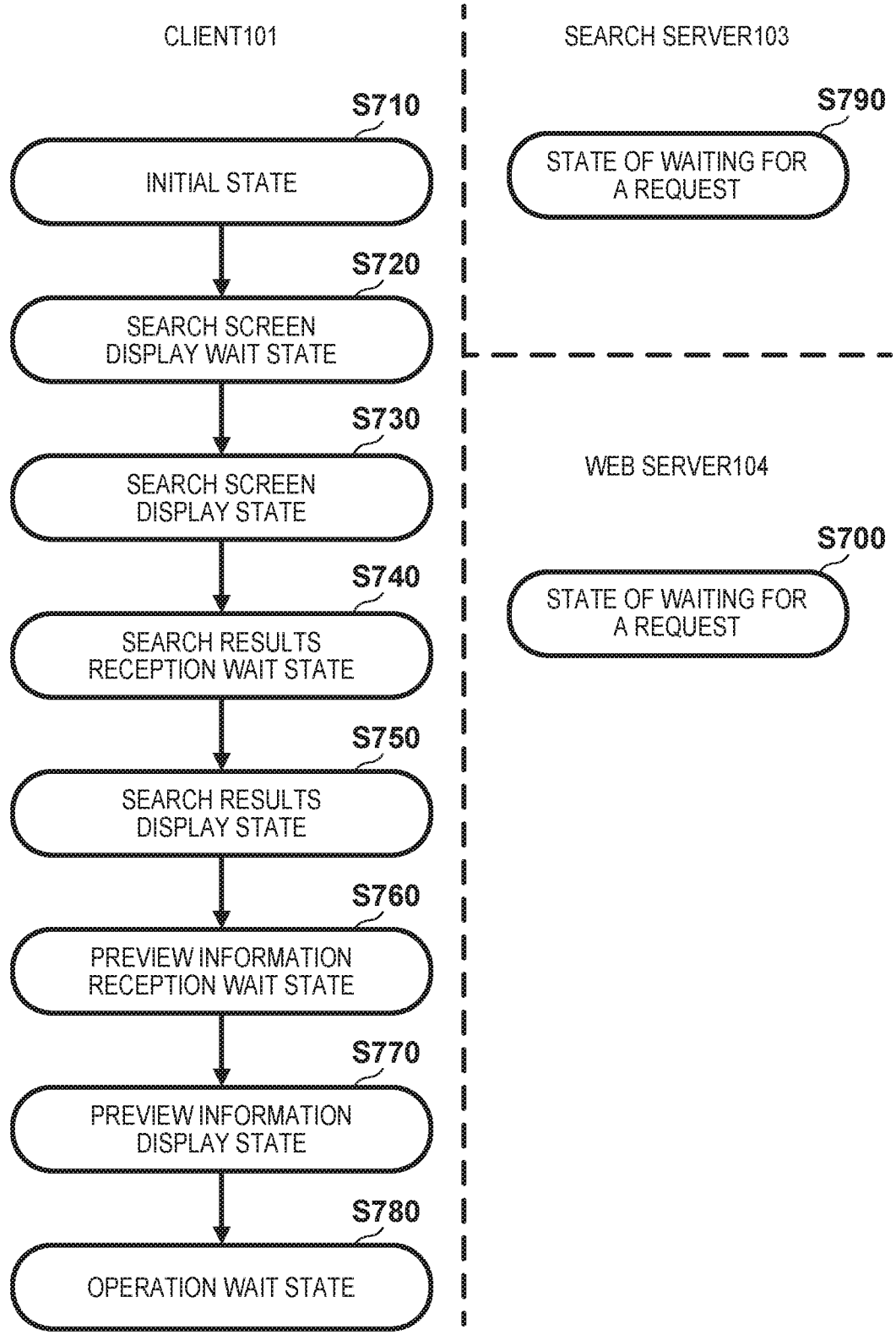
FIG. 7A is a flowchart for illustrating an example of a search process corresponding to an embodiment of the invention.

Firstly, FIG. 7A is a view for illustrating state transitions of the client 101, the search server 103, and the Web server 104. In FIG. 7A, the client 101 takes the states from step S710 to step S780, and in each state processing illustrated in FIG. 7B through FIG. 7H is performed. Also, the search server 103 is in a state of waiting for a request from the client 101, and in accordance with a request received from the client 101, processing illustrated in FIG. 7I, which is explained later, is executed. The Web server 104 is in a state of waiting for a request from the client 101, and in accordance with a request received from the client 101, processing illustrated in FIG. 7J, which is explained later, is executed.

Figure 7B:
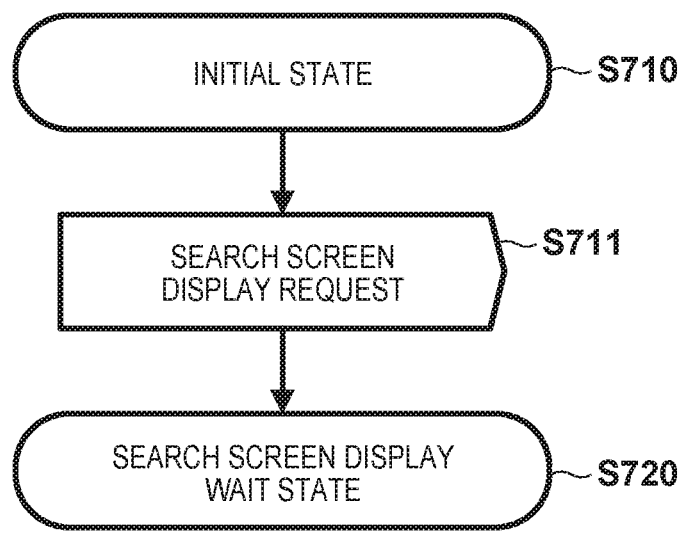
FIG. 7B is a flowchart illustrating an example of processing in an initial state of the client 101 in a search process corresponding to an embodiment of the invention.

Firstly, the client 101 is in an initial state in step S710. In this initial state, a search screen is not displayed on the display 207 of the client 101, and a search screen display request is transmitted to the search server 103 in step S711, as is illustrated in FIG. 7B. After that, transition is made to a search screen display wait state of step S720.

Figure 7C:
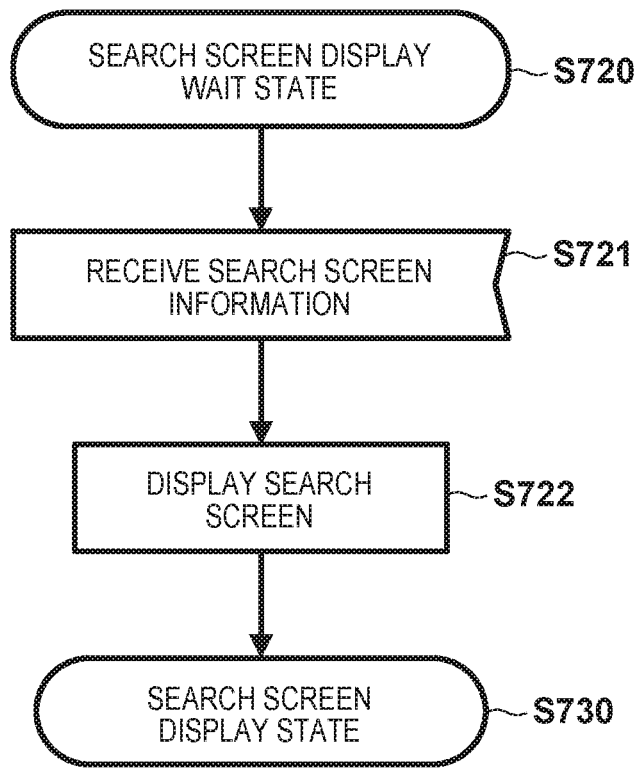
FIG. 7C is a flowchart illustrating an example of processing in a search screen display wait state of the client 101 in a search process corresponding to an embodiment of the invention.

In the search screen display wait state of step S720, as is illustrated in FIG. 7C, the client 101 receives search screen information from the search server 103 in step S721, displays the search screen on the display 207 in step S722, and transitions to the search screen display state in step S730.

Figure 9:
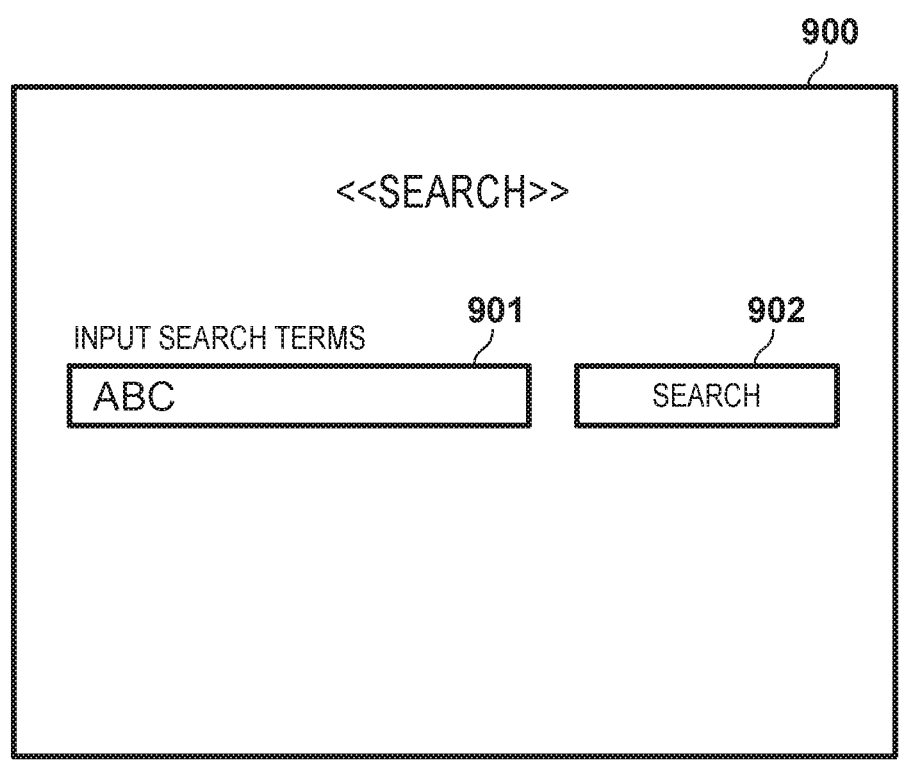
FIG. 9 is a view for illustrating an example of a search screen corresponding to an embodiment of the invention.

An example of the search screen is as is illustrated in FIG. 9. In FIG. 9, a search term input area 901 and a search execution button 902 are included in a search screen 900. The characters configuring the search terms in the search term input area 901 can be input in kanji, hiragana, katakana, alphabet, symbols, numerals, or the combined words. In FIG. 9, "ABC" is input as the search term.

Figure 7D:
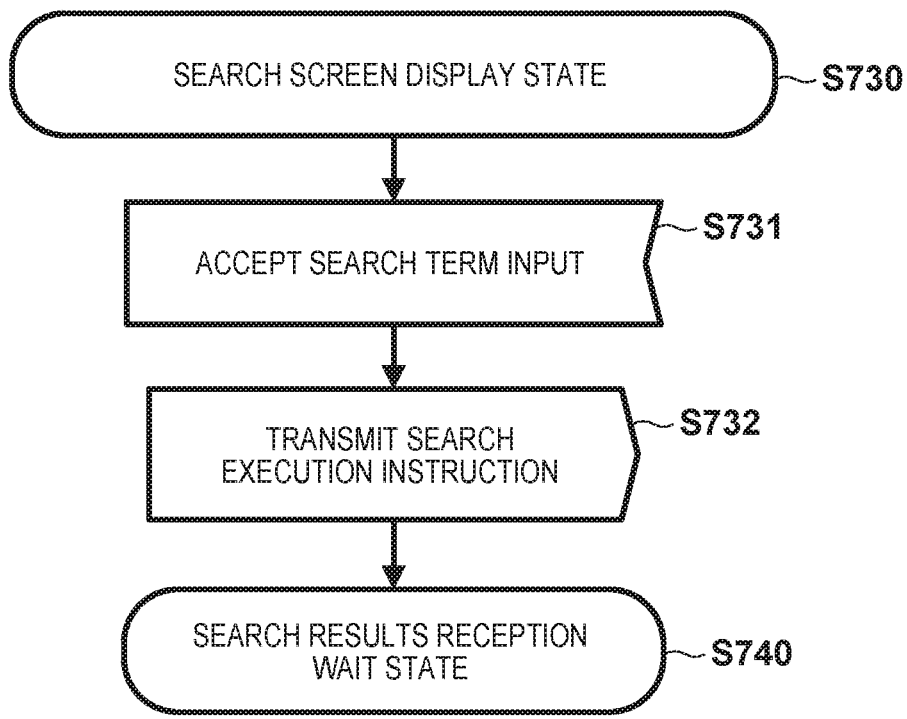
FIG. 7D is a flowchart illustrating an example of processing in a search screen display state of the client 101 in a search process corresponding to an embodiment of the invention.

In the search screen display state of step S730, as is illustrated in FIG. 7D, the client 101 accepts search term input from the user in step S731. Continuing on, in step S732, a search execution instruction is accepted from a user based on an operation of the search execution button 902 in FIG. 9, and the search execution instruction designating the search term is transmitted to the search server 103. After that, transition is made to a search results reception wait state of step S740.

Figure 7E:
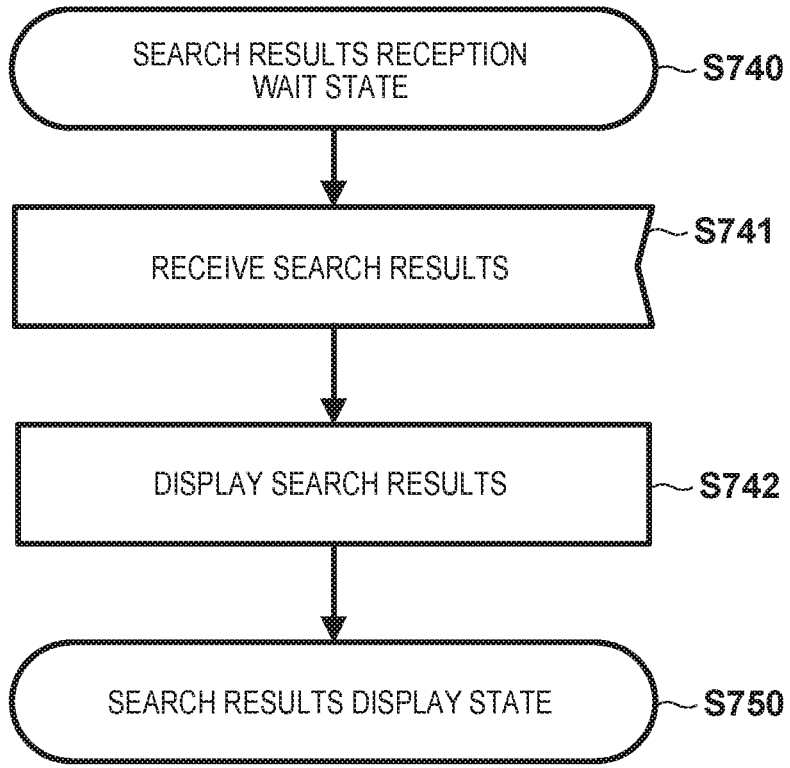
FIG. 7E is a flowchart illustrating an example of processing in a search results reception wait state of the client 101 in a search process corresponding to an embodiment of the invention.

In the search results reception wait state of step S740, as illustrated in FIG. 7E, search results are received from the search server 103 in step S741. Continuing on, in step S742, the received search results are displayed on the display 207, and transition is made to the search results display state of step S750. An example of the search result display state is as is illustrated in FIG. 10A. In FIG. 10A, a window 1000 illustrates the Web browser display screen on the whole. A configuration of the Web browser is not explained particularly because it is typical, but, for example, various Web browsers such as Internet Explorer, Chrome, Firefox, Safari or the like can be used.

The search results are displayed distinguishing each link, and a link 1001 for connecting to a URL of the body of the search result, a URL display 1002 for indicating a URL of a connection destination of the link 1001, and a thumbnail image 1003 linked to the page image are included in each given area. Note that the URL display 1002 may be content indicating a corresponding page for a file, for example a PDF file, for which it is possible to access in units of pages. For example, if a fourth page of "letter.pdf" which comprises 50 pages is included in the search results, the URL "http://www.abc.com/letter.pdf#page=4" designating the fourth page is displayed in the URL display 1002. In such a case, in the thumbnail image 1003 an image (letterS004.jpg) corresponding to that page is displayed. Also, even if the thumbnail image can be prepared in units of pages, for a document file (for example, MS Word or the like) for which a page cannot be designated by a URL in accordance with a restriction based on the application that handles the document file, the URL display 1002 is made to be a link to the file on the whole, and the thumbnail image 1003 displays a thumbnail image of the corresponding page. Note that even in such a case it is possible to provide a preview image, preview information or the like in units of pages. In addition, while it is possible to display a summary text of a related location, in FIG. 10A this is omitted to simplify the drawing. Note that, if the image of the document of the link destination, is not registered in the image registration table 600, either the thumbnail image 1003 is not displayed, or an image is displayed as an alternative.

Figure 7F:
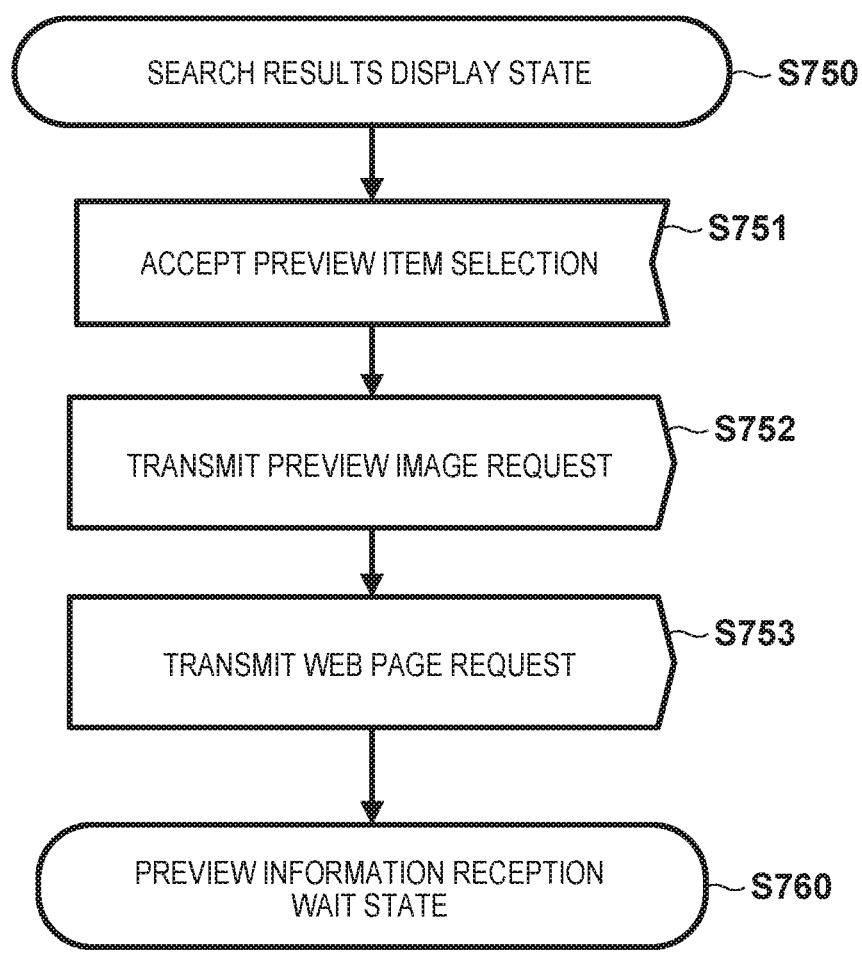
FIG. 7F is a flowchart illustrating an example of processing in a search results display state of the client 101 in a search process corresponding to an embodiment of the invention.

In the search results display state of step S750, as illustrated in FIG. 7F, the selection of an item, from the items displayed in the list of the search result in step S751, for which to perform the preview display is accepted from a user. The selection of the item can be performed by causing a cursor to move on the thumbnail image 1003 or clicking in the example of displaying result of FIG. 10A, for example. Note that, the thumbnail images connect to a URL of the document file (a Web page) of the selection item when the click is accepted, and because they are used as link images for obtaining a preview image or preview information if the cursor is positioned thereabove, link information is embedded in these. Continuing on, in step S752, the selected item is designated, and a preview image request is transmitted to the search server 103. Furthermore, in step S753, a request for a document file (Web page) selected based on the URL of the connection destination of the embedded link is transmitted to the search server 103 or the Web server 104. A case in which a Web page request is transmitted to the search server 103 is a case in which a non-HTML file such as a PDF file, as is registered in the storage destination URL 503 in FIG. 5, is converted into an HTML file and saved by the search server 103. Meanwhile, for data that the Web server 104 stores as an original HTML file (for example, maindocument.html, or the like), a Web page request is transmitted to the Web server 104. After that, transition is made to a preview information reception wait state of step S760.

Figure 7G:
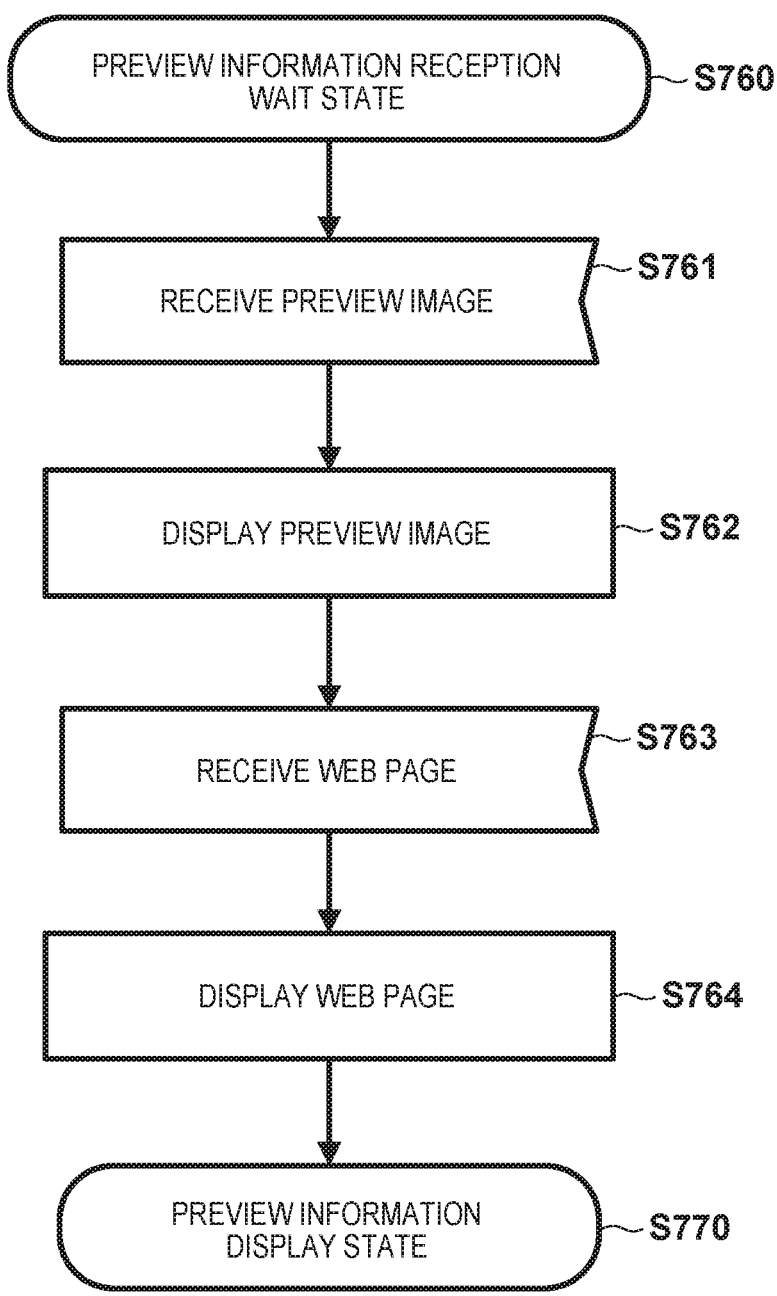
FIG. 7G is a flowchart illustrating an example of processing in a preview information reception wait state of the client 101 in a search process corresponding to an embodiment of the invention.
Figure 10B:
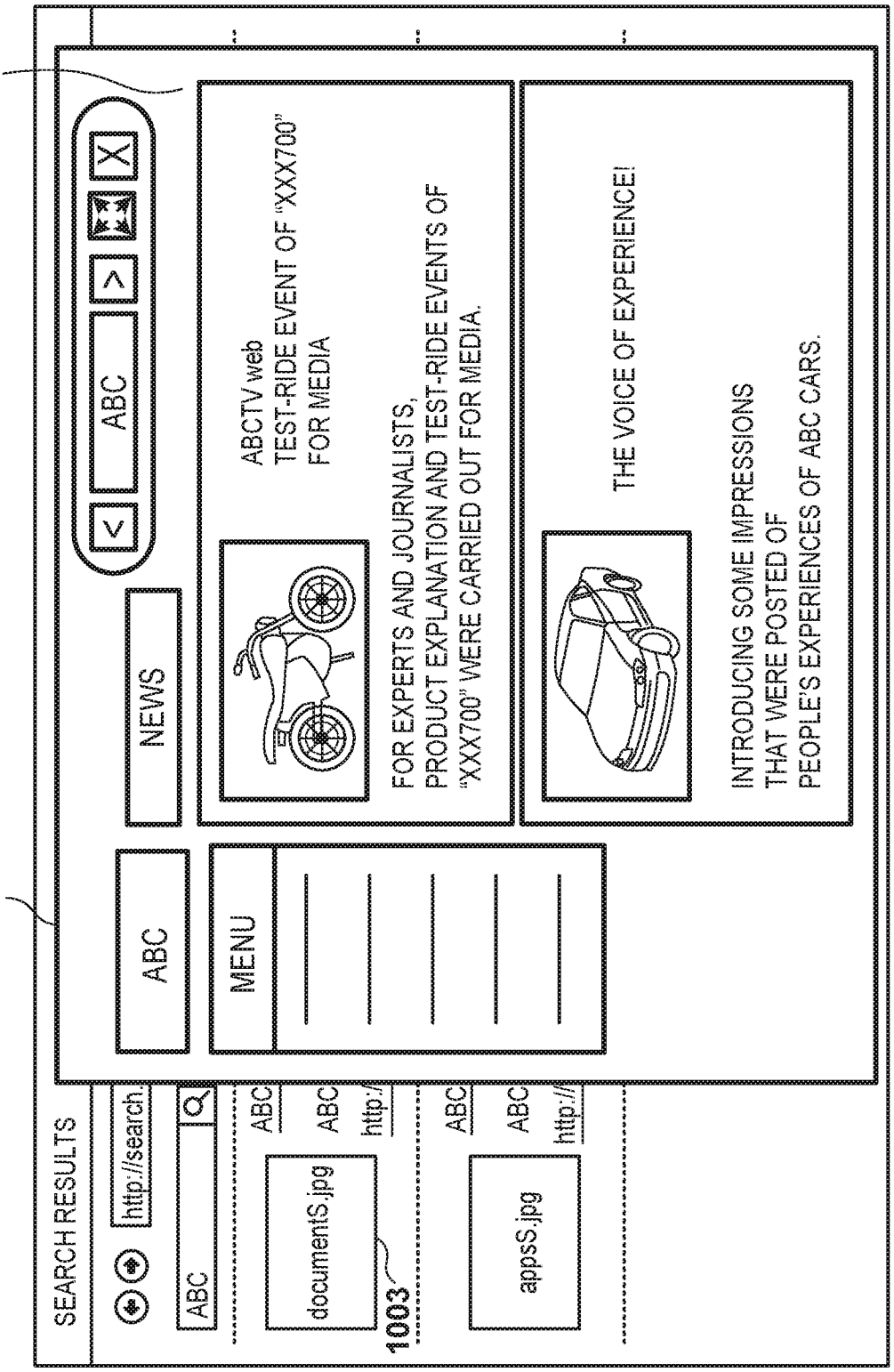
FIG. 10B is a view for illustrating an example of a search results preview display corresponding to an embodiment of the invention.

In a preview information reception wait state of step S760, as illustrated in FIG. 7G, first a preview image is received from the search server 103 in step S761. Continuing on, the preview image received in step S762 is displayed on a preview area. The display state here is as is in FIG. 10B, for example. In FIG. 10B, a preview area 1010 displaying a page image 1011 is superimposed on the window 1000 which displays the search results. In the present embodiment, the page image is first transmitted to allow the display content to be confirmed.

Next, in step S763, page data of a Web page is received from the search server 103 or the Web server 104 as preview information. Continuing on, the Web page received in step S764 is replaced with the displayed page image 1011 to update the preview area 1010, and a preview information display state of step S770 is entered. The display state here becomes similar to FIG. 10B, for example, in outer appearance by the displayed information simply being changed from the image to the Web page.

Figure 7H:
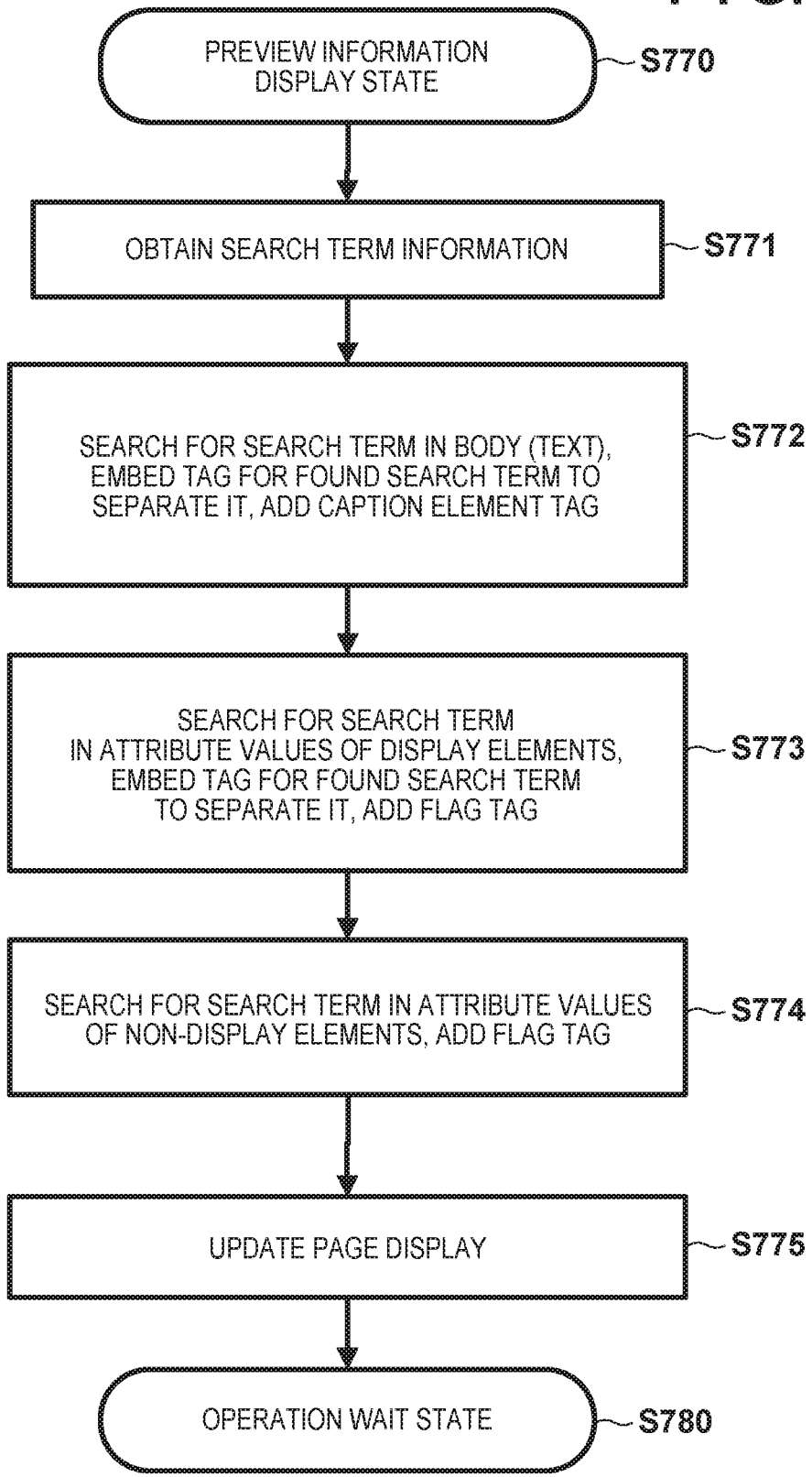
FIG. 7H is a flowchart illustrating an example of processing in a preview information display state of the client 101 in a search process corresponding to an embodiment of the invention.

Next, in the preview information display state of step S770, a preview information display is performed by processing the Web page into information for the preview display based on a search term as illustrated in FIG. 7H. Specifically, the search term is obtained in step S771. The search term can be extracted by referencing a referrer that the browser holds as an internal variable. This is because a search term used in the search is included in a case where information of a page of a link source of a Web page that is currently displayed is included in the referrer, and the link source is the search results screen.

Next, in step S772, the search term is searched for in the body (text) to be displayed on the preview area in the Web page that is displayed, and a tag is embedded to separate the search term that is found. Here, the embedded tag is, for example, <span> </span>, and the display position of the search term can be identified thereby. Also, for example, when the search term is assumed to be ABC, and the body is a sentence 1 below, an example of the embedding is illustrated in sentence 2.

"Introducing some impressions that were posted of people's experiences of ABC cars" . . . (sentence 1)

"Introducing some impressions that were posted of people's experiences of <span>ABC</span>cars" . . . (sentence 2)

In order to further add an emphasized display element (for example, a caption element) to the search term separated in this way, the tags <em> </em> are added. An example of adding the tags to sentence 2 is illustrated in sentence 3.

"Introducing some impressions that were posted of people's experiences of <span>ABC</span> <em>ABC</em>cars" . . . (sentence 3)

The foregoing processing is performed for all search terms found in the body. Next, transition is made to step S773, and a search of the search term is performed for an attribute values of display elements. The attribute values of the display elements are attributes (metadata) added to, for example, a table, an image, or the like. For example, there are examples such as sentence 4 below if it is an image.

<img alt="ABC logo" src=" . . . "/>(sentence 4)

When an emphasized display element is added with respect to this, it is as illustrated in sentence 5.

<img alt="ABC logo" src=" . . . "/> <em>ABC</em> . . . (sentence 5)

The foregoing processing of step S773 is performed for all search terms found for an attribute values of display elements. The emphasized display of the display element makes different the outer appearance to a caption element added for a search term in the text. For example, the emphasized display element of the display element may simply add a predetermined mark (for example, a flag) without including the search term.

Next, transition is made to step S774, and a search of the search term is performed for attribute values of non-display elements. An attribute value of a non-display element means information of a meta tag added to a page title or a page such as is shown below, for example.

<title>ABC homepage: ABC Industrial K.K. </title>
<meta name="keywords" content="ABC homepage, ABC, ABC Industrial K.K., ABC Industrial">

<meta name="description content="Welcome to the ABC Web site. This site is the official site of ABC Industrial K.K.">

Because while the foregoing meta tag information is not visually displayed in the page display in the client 101, it is within a search term search range, an emphasized display is performed to signal its existence to the user in the present embodiment. Specifically, tags such as, for example, <em>non-display area match </em> are added. Because the emphasized display of the non-display element is not necessarily displayed in relation to a particular element, a caption or the like may be caused to display in a particular position in a display area as a display for notifying the user that a non-display area search term was hit.

Next, transition is made to step S775, and the content of the page being displayed is updated based on the result of the processing from step S772 to step S774, and after that transition is made to an operation wait state of step S780. In the operation wait state, an operation of a user on a preview area that the client 101 displays is accepted, and a display is performed in accordance with the operation.

Also, when the page is updated in step S775, a style sheet is referenced or applied to determine the display state of the emphasized display. The style sheet is information for defining the display form of an added emphasized display, and defines the following information, for example.
 a character style and color for the emphasized display (defined for text, a display element, and a non-display element)
 a shape layout for the emphasized display (defined for text, a display element, and a non-display element)
 display/non-display of the emphasized display (display time, condition for display erasure)
 designation of a free coordinate position for an overlay designation for displaying in front of the original document Note that, for a style sheet, something inserted in a Web page by a script for executing the processing may be referenced, a style may be designated as a value of a style attribute in respective tags, or it may be applied directly by a script. If inserted in the Web page, a description for reading an external style sheet file having a ".css" file extension by a <LINK>tag may be made, or a style sheet may be described directly using a <STYLE>tag in <HEAD> . . . </HEAD>, or the like.

Note that processing in the preview information display state illustrated in FIG. 7H can be realized by a script for executing this processing being described in the Web page provided from the Web server 104, for example, and the browser in the client 101 executing this script. Also, even in the case where the script is not embedded in the Web page, if the browser has a function for executing processing corresponding to FIG. 7H, it is possible to similarly realize it.

By the above, preview information, for which an emphasized display that indicates the position of a search term in the page is included, is displayed. FIG. 11 illustrates an example of a source file of a Web page processed by the client 101 in order to perform an emphasized display in accordance with the foregoing processing. In FIG. 11, an area 1101 which is surrounded by dotted lines illustrates a page title in a non-display element. Similarly, a dotted line area 1102 indicates an example of a case in which a style sheet is inserted in the page. A dotted line area 1103 illustrates information of meta tags in a non-display area, and a caption element corresponding to a non-display area is a dotted line 1104, and is inserted into the page body (from the <body>tag). A dotted line area 1105 indicates a result of performing processing on an image which is a display element. A dotted line area 1106 indicates a result of performing processing on text in the body.

FIG. 10C is a view for illustrating an example of displaying preview information, for which an emphasized display that indicates the position of a search term in the page is included. A preview area 1020 including an emphasized display of the search term is superimposed on the window 1000 which displays the search results. Note that the client 101 generates preview information in accordance with the content of the Web page for which a preview is requested and a search term, and it may be updated from the display content of the original Web page that is displayed. Note that in the present embodiment, a page image is displayed first so that a blank does not occur in the preview area since it takes time for obtainment from the Web server 104 of the Web page, and the page image is replaced when the Web page is obtained.

With this, it is possible to prevent a frustration of a user due to waiting for obtainment of the Web page and the generation of the preview information. Also, because a user can determine whether or not a page is the page that he is searching by the content of the preview image, it is possible to select the next search result without waiting for reception of the preview information if it is an unnecessary page. Note that display of the preview image may be omitted in accordance with a processing rate of the client 101, the communication rate or the like. This is because in an environment in which a communication rate and a processing rate are sufficiently ensured, it is possible to cause a Web page to be displayed on the preview area 1010 in a state in which the user is not given stress even though the preview image is not displayed.

In FIG. 10C, an emphasized display by a caption 1021 is performed for a portion corresponding to the search term in the Web page. In FIG. 10C, 2 captions of captions 1021*a* and 1021*b* are displayed. Both are displayed with respect to characters (text) corresponding to "ABC" which is the search term. Next, if a word corresponding to the search term is included in an attribute value of a display element in the Web page, an emphasized display by a flag display 1022 in association with the display element is performed. In FIG. 10C, 3 from the flag display 1022*a* to 1022*c* are displayed. These flag displays are added to an image which is 1 display element, and such a display is performed in a case where a file name of an image, a word corresponding to information surrounded by quotation marks in a tag, or the like exists. Also, a display 1023 of "match in non-display area" is displayed in a case where a meta tag that does not appear in a table as display information when the Web page is displayed, the title, or the like includes a word that matches a search term. By virtue of the display 1023, because the reason that the page is included in the search results can be understood immediately even if a word corresponding to the search term does not exist in the body, the user spending time pointlessly searching for the reason that the page is hit is eliminated.

Also, after the display of the Web page completes, the foregoing emphasized displays 1021 to 1023 may automatically disappear after a predetermined amount of time elapses, or may disappear upon a manual selection operation on the caption by the user, and furthermore, a display/non-display button for the captions may be arranged, and the existence/absence of the display may be made to be operable by this button.

A UI 1024 is an interface for changing the display form. In the operation wait state step S780 of FIG. 7H, it is possible to accept an operation from a user via the UI 1024. In the UI 1024, a search term 1024*b* ("ABC" in the case of FIG. 10C) is displayed, and a "<" button 1024*a*, and a ">" button 1024*c* are included. These buttons are operation buttons for selecting to go to an emphasized display in sequence in the preview display. The button 1024*a* and the button 1024*c* are buttons for selecting the respective displays 1021 through 1023 in a backward direction and in a forward direction. A button 1024*d* is a button for switching the preview area 1020 display size to a full screen display. A button 1024*e* is a button for clearing the preview area 1020 display. The display of the preview area 1020 disappears when the button 1024*e* is operated, and a display state of only the original list of search results of FIG. 10A is returned to.

Next, explanation is given for processing on the side of the search server 103. In step S790 of FIG. 7*i*, the search server 103 is placed in an initial state of waiting for a request. The search server 103, in this state of waiting for a request, receives either the search screen display request transmitted in step S711 from the client 101, the search execution instruction transmitted in step S732, or the preview image request transmitted in step S752.

When the search screen display request is received in step S791, the search screen information is transmitted to the client 101 in step S792. After that, the state of waiting for a request of step S790 is returned to. Furthermore, when the search execution instruction is received in step S793, transition is made to step S794, and search processing is executed. This search processing is performed using the full-text search database 105 based on a search term included in the search execution instruction. Continuing on, in step S795, search results are transmitted to the client 101, and the state of waiting for a request of step S790 is returned to. When a preview image request is received in step S796, transition is made step S797 and a preview image is transmitted. The preview image is obtained by selecting the page image 602 corresponding to the obtained URL with reference to the image registration table 600 of the image database 106 based on information for identifying a document such as a URL included in the preview image request. After that, the state of waiting for a request of step S790 is returned to. When a Web page request is received in step S798, transition is made step S799 and a Web page is transmitted. This Web page is obtained by selecting a Web page corresponding to the obtained URL with reference to the table 500 of the full-text search database 105 based on the information for identifying an HTML file such as a URL included in the Web page request. After that, the state of waiting for a request of step S790 is returned to.

Figure 7I:
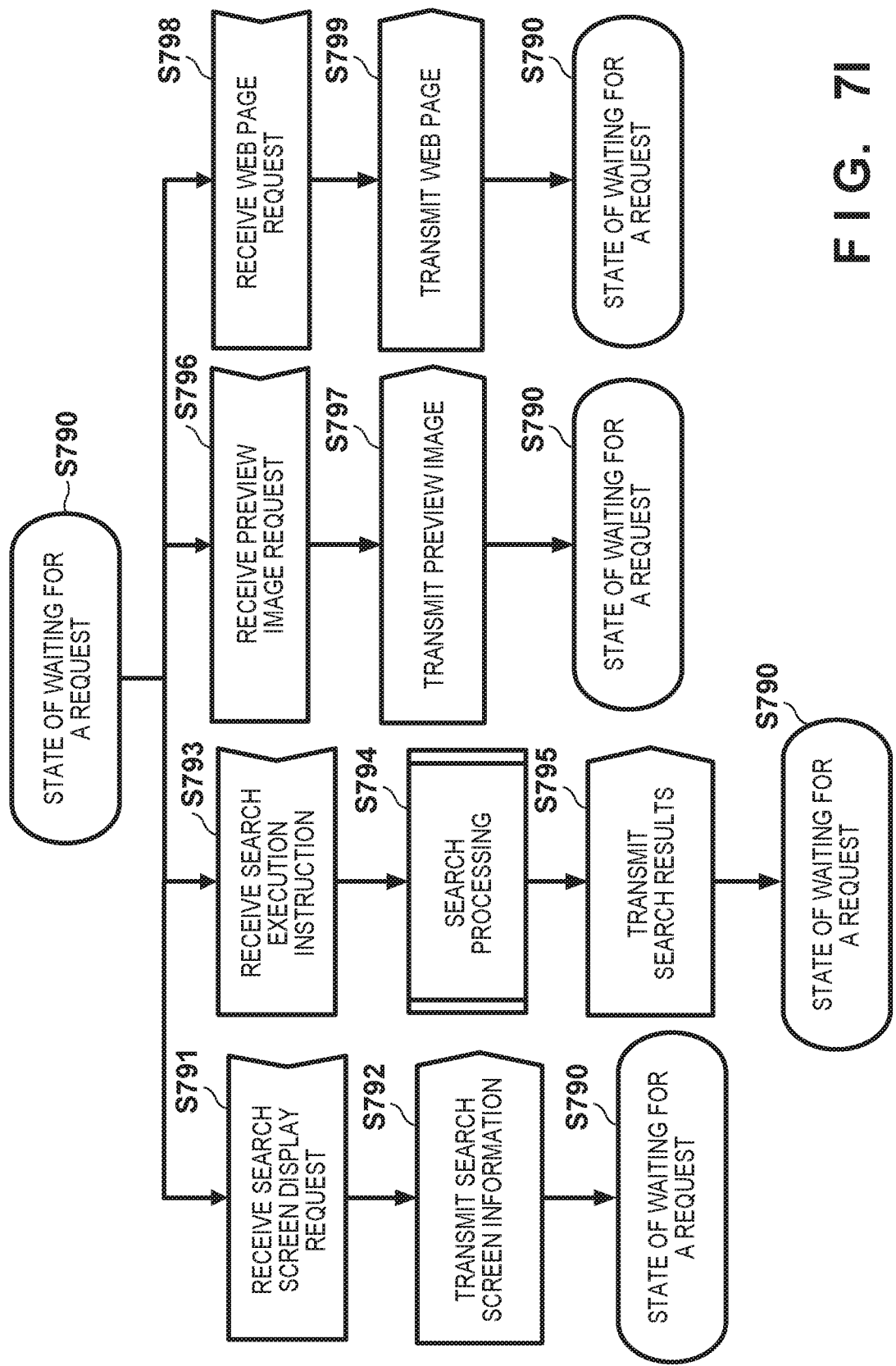
FIG. 7I is a flowchart illustrating an example of processing in a state of waiting for a request of the search server 103 in a search process corresponding to an embodiment of the invention.
Figure 8:
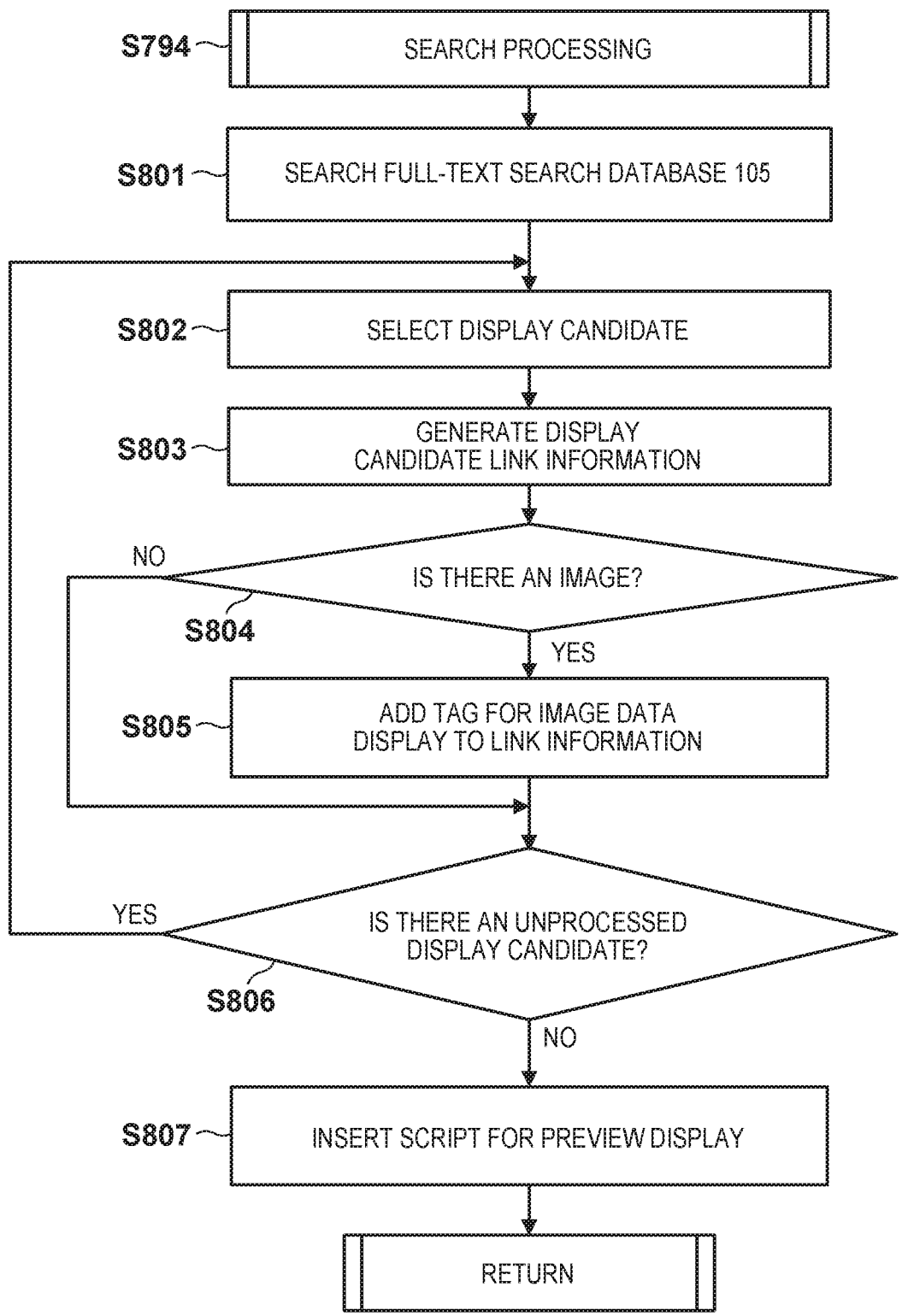
FIG. 8 is a flowchart for illustrating detail of search processing in step S794 of FIG. 7i corresponding to an embodiment of the invention.

Next, for processing in the search server 103 of FIG. 7I, the content of detailed processing is explained. First, FIG. 8 is a flowchart for illustrating detail of a search processing in step S794 of FIG. 7I.

In step S801, the full-text search database 105 is searched based on a search term extracted from the search execution instruction received from the client 101. Here, in a case where a document file that can be divided into pages such as a PDF file is made to be a search target, text of the document file on the whole (example: letter.txt) and text of each page (example: letter1.txt) is all searched. There are cases in which the result of this search is that it is determined that a particular page is significant in the document file, and a determination is made to include it in the search results, and there are cases where it is determined to not narrow down to a particular page, but to include the document file on the whole in the search results because it includes a search term.

For example, in a case where the search term is set as a condition that includes both "ABC" and "Industrial K.K.", if the words "ABC" and "Industrial K.K." are both included in a particular page, the determination is made to include that page in the search results. On the other hand, in a case where "ABC" and "Industrial K.K." each are included in separate pages, there are cases in which a single page cannot be identified as a search result, but it is determined that there is a relationship with the search term at least for the document file on the whole, and a determination is made to include a single page in the search results.

Next, in step S802, a display candidate of the search results is selected in a display order. In step S803, display candidate link information is generated. The link information generated here is information for connecting to the URL of the body of the search result. Here, the URL of the body is essentially information for identifying data registered in the site information database 107 of the Web server 104. For example, in a case where the display candidate is the fourth page of "letter.pdf" stored in the URL "http://www.abc.com/letter.pdf" in the Web server 104, the link information "http://www.abc.com/letter.pdf#page=4" for connecting to the fourth page of the URL "http://www.abc.com/letter.pdf" is generated in a case where the search results are displayed on the display 207 of the client 101, and a click operation of the user is performed. Note that in a case where links can be designated in units of pages, link information that designates a page is generated, but because there are those for which a page cannot be designated depending on the format of the document file, the file on the whole is designated for such a document file.

Next, in step S804, it is determined whether or not image data corresponding to the URL described as the link information in step S802 is registered in the image registration table 600. For example, if a display candidate is the fourth page of "http://www.abc.com/letter.pdf", it is determined whether or not the page image 602 and the thumbnail image 603 that have the URL as the obtainment source URL 601 are registered. In a case where it is determined that an image is registered ("YES" in step S804), transition is made step S805. Meanwhile, in a case where it is determined that an image is not registered ("NO" in step S804), transition is made step S806.

In step S805, a tag for an image data display is added to the link information of the display candidate. For example, if the display candidate is the fourth page of "<a href=" http://abc.com/letter.pdf">letter</a>", there is "letter00.jpg" for the page image 602 and "letterS004.jpg" for the thumbnail image 603 registered in association with the URL "http://abc.com/letter.pdf". Then the URL for identifying the position at which these is stored in the image database 106 can identify "http://search.com/JPG/letter/letter004.jpg" and "http://search.com/JPG/letter/letterS004.jpg" based on the storage destination URL. Out of these, the thumbnail image "letterS004.jpg" is used as a link image for accepting a click and making a request for a Web page to the Web server 104, and additionally the page image "letter004.jpg" is used for a preview display upon selection. Accordingly, as an example, <a href="http://www.abc.com/letter.pdf#page=4"
onMouseOver="preview('http://search.com/JPG/letter/letter004.jpg', 'http://search.com/HTML/letter/letter004.html')">
<img src="http://search.com/JPG/letter/letterS004.jpg"></a> is described.

In such a case, the storage location of the body of the document file and the storage location of the HTML file that is the source of the preview information are different. This is because since the document file is a PDF file, the PDF file of the body is managed by the Web server 104, and the HTML file that is the source of the preview information is managed by the search server 103. Accordingly, in a case where the document file of the search results is originally a Web page of an HTML format, the storage location of the body of the document file and the storage location of the HTML file that is the source of the preview information match. For example, for the case of "maindocument.html" of FIG. 5, the foregoing recitation is as follows.

<a href="http://www.abc.com/maindocument.html" onMouseOver="preview('http://search.com/JPG/document/document.jpg', 'http://www.abc.com/maindocument.html')">
<img src="http://search.com/JPG/document/documentS.jpg"></a>

Note that as with when the link of the display candidate is "<a href="http://abc.com/letter.pdf">letter</a>", in a case where the document file on the whole is indicated, the thumbnail image and the page image for the page that is designated as the representative page are used.

By the above, for 1 display candidate, it is possible to generate search result display information including link information for linking to an original URL, and a preview display operation upon a selection. However, in addition to the preview display operation upon the selection being directly described within the HTML as described above, it may be performed from a program by a separate script. The foregoing processing is performed for all display candidates included in the search results, and the search result display information is completed in a case where the link information is generated for all.

Accordingly, in step S806, it is determined whether or not there is an unprocessed display candidate, and in a case where there is an unprocessed display candidate, step S802 is returned to, and the processing continues. Meanwhile, in a case where link information for all display candidates is generated, transition is made to step S807. In step S807, in a case where a thumbnail is selected in the search result display, a script (JavaScript) for a preview display for displaying the preview area as illustrated in FIGS. 10B and C is included in the data of the search results. After this, the processing in step S794 terminates, and transition is made step S795.

Note that summary text for each display candidate may be attached to the search result display information, but because the corresponding method for attaching the summary text is a publicly known technique, explanation in the present specification is omitted. Also, in the foregoing explanation, a case in which a thumbnail image exists is explained, but even in the case where only a page image is registered in a table 600, it is possible to generate link information by similar processing by displaying in text the link of the page image in place of the thumbnail image.

Next, explanation is given for processing on the side of the Web server 104. In step S700 of FIG. 7J, the Web server 104 is placed in an initial state of waiting for a request. In this state of waiting for a request, the Web server 104 receives a Web page request transmitted in step S753 from the client 101.

In step S701, when the web page request is received, the requested Web page is obtained, in step S702, from the site information database 107, and transmitted to the client 101 in step S703. After that, the state of waiting for a request of step S700 is returned to. Note that in the Web page that the Web server 104 transmits here, a script for the client 101 to execute the processing in the preview information display state illustrated in FIG. 7H may be described.

By virtue of the present embodiment above, when search results of a Web browser of the client 101 are displayed, an emphasized display of a search term in a preview display is performed using a document file of a link destination of a search result, and it becomes possible to immediately understand visually the location of the search term in the search results. Because in the preview display, information indicating the location of the search term can be provided in the unique layout information positional relationship in HTML or the like that the content producer intended, a user is enabled to immediately determine efficiently whether or not the corresponding document is actually the document the user is searching.

Also, because the preview information generated in the present embodiment is something for which processing is applied in order to perform an emphasized display relating to a search term on an original document file stored in the site information database 107, and the information other than the emphasized display is all as in the original, it is possible to browse within a page freely in the state of FIG. 10C in which the preview information is displayed, and for link information included in the page, it is possible to obtain information of a link destination by operating the link. Also, it is possible to execute JavaScript embedded in the page, and it is further possible to play an attached moving image. Also, in the preview display, configuration may be taken such that the screen automatically scrolls to a position of the head caption display.

Furthermore, because the preview area is displayed in the window displaying the search results, the display of the page is switched every time the content of one link in the search results is confirmed, and work to return to the original screen becomes unnecessary.

Second Embodiment

Below, explanation is given for another embodiment of the present invention. However, the configuration elements described in this embodiment are only examples, and the scope of the invention is not limited to these.

The configuration of a system and the hardware configuration in the present embodiment are similar to those illustrated in FIG. 1 through FIG. 3, but in the present embodiment, an image provision function in the search results, and a function for causing a preview area for an item selected from the search results to be displayed are omitted. Accordingly, in the search server 103, the image database 106 is unnecessary. Also, the generation processing method for the data for searching is essentially similar to as is illustrated in FIG. 4, an image to attach to the search results is not generated. Accordingly, step S404 through step S406 are omitted. Also, the table of FIG. 6 is unnecessary.

Figure 7J:
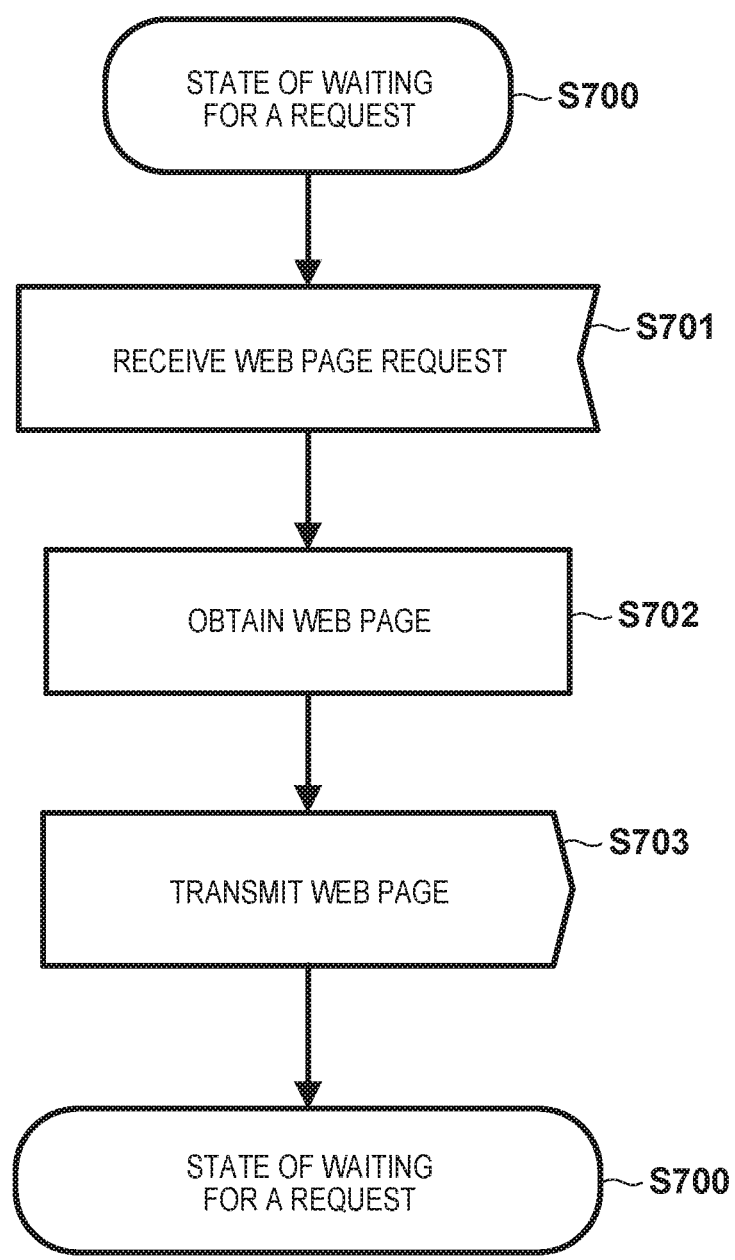
FIG. 7J is a flowchart illustrating an example of processing in a state of waiting for a request of the Web server 104 in a search process corresponding to an embodiment of the invention.

Regarding details of the search processing, the processing from step S710 through step S750 in FIG. 7A among FIG. 7A through 7J is essentially the same, but step S752 in the processing of the search results display state of FIG. 7F is omitted. Also, regarding the preview displays of step S760 and step S770, the preview areas 1010 and 1020 as in FIG. 10B and FIG. 10C are not displayed separately from the window 1000; rather the preview area is displayed directly in the window 1000. Accordingly, in FIG. 7G, step S761 and step S762 are omitted. Also, for the processing of FIG. 7I, step S796 through step S799 is omitted. The processing of FIG. 7J is the same. Next, in the search processing of FIG. 8, step S804, step S805, and step S807 is omitted.

In this way, it becomes possible to switch to a display as in FIG. 10D when the link 1001 is clicked in the search results display (note that there is no display of the thumbnail image 1003) of FIG. 10A, for example. In FIG. 10D, the display content that is displayed in the preview area in the window that displays the search results in FIG. 10C is displayed directly as a screen 1030 within the display area of the window 1000. Also, for a page title 1031, the title of the Web page is indicated (the ABC homepage: ABC Industrial K.K.), and for the URL as well, that of a Web page (http://abc.com/main.document.html) is displayed. The processing for generating the screen 1030 is similar to FIG. 7H.

Even in the case where the page is displayed directly from the search results in this way, a caption display for a specific corresponding search term is performed by the present invention, and a user can confirm the location in the page of the search term immediately.

Note that, the generation of the preview area in the foregoing embodiments may be restricted so as to be executed only in a case where the Web page is provided to the client 101 by linking from the search results. For example, it is possible to determine from where the page prior to the obtained page is provided by referencing the foregoing referrer that the browser holds as an internal variable. Accordingly, configuration may be taken such that whether or not the previous page is a page that displayed the search results is determined based on whether or not a predetermined URL of the search engine is included in the HTTP referrer, and only in a case where it is included is the processing of FIG. 7H performed, and the processing of FIG. 7H is not executed in a case where the URL is not included.

For the foregoing processing (processing in accordance with the flowcharts illustrated in, for example, the foregoing FIG. 4, FIG. 7A through FIG. 7J, and FIG. 8), a computer program is stored in a predetermined storage medium, and by causing a computer to read the program stored in this storage medium (causing it to be installed or copied), this computer can perform the foregoing processing. Accordingly, it is clear that a computer program and a storage medium are within the scope of the present invention.

The invention claimed is:

1. An information processing apparatus, comprising:
a display device;
one or more processors;
a memory; and
one or more programs, wherein the one or more programs are stored in the memory and configured to be executed by the one or more processors, the one or more programs including instructions for:
displaying a search screen, on the display device, for accepting an input of a search term specified by a user, and a first instruction from a user of the information processing apparatus to perform a search using the user-specified search term,
in response to accepting the first instruction, transmitting a search instruction including the user-specified search term to an external search server,
receiving a search result, wherein the search result is a result of a search executed by the external search server in accordance with the search instruction,
displaying the search result on the display device, wherein the displayed search result includes a plurality of pieces of link information,
in response to selection of one of the plurality of pieces of link information by the user, transmitting a request for a Web page to a destination server different from the search server in accordance with the one of the plurality of pieces of link information,
receiving the Web page in accordance with the request from the destination server,
searching for the user-specified search term in the Web page received from the destination server,
inserting a tag into the received Web page for emphasizing the searched user-specified search term when the received Web page is displayed, by executing a first script described in the Web page, and
displaying, on the display device, the Web page, into which the tag is inserted,
with the user-specified search term emphasized according to the inserted tag,
wherein the Web page displayed on the display device includes:
a first indication that text in the displayed Web page corresponds to the user-specified search term,
a second indication that an image in the displayed Web page corresponds to the user-specified search term wherein the second indication includes a flag icon displayed over the image corresponding to the user-specified search term, and
a third indication that meta-information of the received Web page is not displayed in the displayed Web page, and corresponds to the user-specified search term.

2. The information processing apparatus according to claim 1, wherein the tag is inserted into only on the Web page which is received in response to the selection of the one of the plurality of pieces of link information of the search result.

3. The information processing apparatus according to claim 1, wherein the one or more programs further include other instructions for:
searching for the user-specified search term in text in a body included in the received Web page, and text associated with predetermined tags,
wherein the predetermined tags include a tag defining at least a Web page title, a tag for designating a display image, and a tag for defining page information.

4. The information processing apparatus according to claim 1, wherein
displaying the Web page on the display device includes displaying an interface for controlling a display form of the display of the Web page into which the tag is inserted, and
the one or more programs further include other instructions for,
in accordance with an operation of the interface, executing one of:
a display in which the emphasized user-specified search term is selected in an order of appearance or in a reverse order,
a full screen display of the Web page into which the tag is inserted, or erasure of a display of the Web page into which the tag is inserted.

5. The information processing apparatus according to claim 1, wherein the one or more programs further include other instructions for terminating emphasizing of the user-specified search term after a predetermined amount of time elapses after the Web page into which the tag is inserted is displayed.

6. The information processing apparatus according to claim 1, wherein the one or more programs further include other instructions for, in response to selection of any of the user-specified search terms emphasized while the Web page into which the tag is inserted for the emphasized display is displayed, terminating emphasizing the any of the user-specified search terms.

7. The information processing apparatus according to claim 1, wherein the one or more programs further include other instructions for:
- in response to selection of the one of the plurality of pieces of link information transmitting a request for a preview image of a Web page corresponding to the one of the plurality of pieces of link information to the search server,
- receiving the preview image,
- displaying the preview image until the Web page becomes displayable on the display device, and in response to the Web page becoming displayable,
- displaying the Web page replacing the preview image.

8. The information processing apparatus according to claim 1, wherein in displaying the Web page on the display device, the Web page into which the tag is inserted is displayed in an area in a window for displaying the search result.

9. The information processing apparatus according to claim 8, wherein the display in the area in the window is performed by executing a second script included in the search result received from the external search server.

10. The information processing apparatus according to claim 1, wherein in displaying the Web page on the display device, the Web page into which the tag is inserted is displayed in an area in a window displaying the search result, replacing the search result.

11. The information processing apparatus according to claim 1, wherein the first indication includes a caption that indicates the text corresponding to the user-specified search term.

12. The information processing apparatus according to claim 1, wherein the third indication indicates a message that the text corresponding to the user-specified search term is included in a tag of the received Web page and does not contribute to displaying the received Web page.

* * * * *